United States Patent
Irikura et al.

(10) Patent No.: US 6,524,205 B1
(45) Date of Patent: Feb. 25, 2003

(54) INTEGRAL-TYPE HYDRAULIC AND MECHANICAL TRANSAXLE APPARATUS FOR DRIVING AND STEERING A VEHICLE

(75) Inventors: Kohji Irikura, Amagasaki (JP); Norihiro Ishii, Amagasaki (JP); Ryota Ohashi, Amagasaki (JP); Kenichi Takada, Amagasaki (JP); Hirohiko Kawada, Amagasaki (JP); Robert Abend, Morristown, TN (US); Hiroaki Shimizu, Morristown, TN (US)

(73) Assignees: Kanzaki Kokyukoki Mfg. Co., Ltd. (JP); Tuff Torq Corporation, Morristown, TN (US)

( * ) Notice: Subject to any disclaimer, the term of this patent is extended or adjusted under 35 U.S.C. 154(b) by 0 days.

(21) Appl. No.: 09/622,414

(22) PCT Filed: Apr. 6, 2000

(86) PCT No.: PCT/JP00/02250
§ 371 (c)(1),
(2), (4) Date: Aug. 16, 2000

(87) PCT Pub. No.: WO01/28800
PCT Pub. Date: Apr. 26, 2001

(30) Foreign Application Priority Data

Oct. 22, 1999 (JP) .............................. 11-301548

(51) Int. Cl.[7] .......................... B60K 17/10; F16H 47/04
(52) U.S. Cl. ........................... 475/23; 475/73; 180/307
(58) Field of Search .............................. 475/23, 24, 73, 475/74; 180/307, 6.3, 6.44

(56) References Cited

U.S. PATENT DOCUMENTS

| | | |
|---|---|---|
| 2,191,961 A | 2/1940 | Howell |
| 2,255,348 A | 9/1941 | Brown |
| 2,311,922 A | 2/1943 | Allin |
| 2,332,838 A | 10/1943 | Borgward |
| 2,336,911 A | 12/1943 | Zimmermann |

(List continued on next page.)

FOREIGN PATENT DOCUMENTS

| | | |
|---|---|---|
| CH | 249274 | 6/1947 |
| DE | 4224887 A | 9/1993 |
| EP | 0 806 337 A1 | 12/1997 |
| FR | 1147142 | 10/1960 |
| GB | 2 303 829 A | 3/1997 |

(List continued on next page.)

OTHER PUBLICATIONS

Westwood, The Westwood Clipper Owners Instruction Manual, pp. 1–19, date of publication unknown, believed to be published in Australia.
Brochure Regarding Differential Steering, pp. 4–15. No. date.

(List continued on next page.)

*Primary Examiner*—Ankur Parekh
(74) *Attorney, Agent, or Firm*—Sterne, Kessler, Goldstein & Fox PLLC

(57) ABSTRACT

An integral-type transaxle apparatus comprising a single housing in which a pair of driving axles, a differential mechanism for differentially connecting both said driving axles to each other, a driving hydraulic stepless transmission which fluidly connects a hydraulic pump and a hydraulic motor, a steering hydraulic stepless transmission which fluidly connects a hydraulic pump and a hydraulic motor, a mechanical transmission for transmitting outputs of both said hydraulic stepless transmissions to said differential mechanism are accommodated, wherein at least one of said hydraulic stepless transmissions is disposed such that a rotational axis of a pump shaft of said one hydraulic stepless transmission and a rotational axis of a motor shaft of said one hydraulic stepless transmission are perpendicular to each other.

23 Claims, 20 Drawing Sheets

U.S. PATENT DOCUMENTS

| | | |
|---|---|---|
| 2,336,912 A | 12/1943 | Zimmermann |
| 2,391,735 A | 12/1945 | Orshansky, Jr. |
| 2,530,720 A | 11/1950 | Paulson |
| 2,745,506 A | 5/1956 | McCallum |
| 2,763,164 A | 9/1956 | Neklutin |
| 2,936,033 A | 5/1960 | Gates |
| 3,059,416 A | 10/1962 | Campbell |
| 3,371,734 A | 3/1968 | Zaunberger et al. |
| 3,376,760 A | 4/1968 | Gordainer |
| 3,395,671 A | 8/1968 | Zimmerman, Jr. |
| 3,450,218 A | 6/1969 | Looker |
| 3,492,891 A | 2/1970 | Livezey |
| 3,530,741 A | 9/1970 | Charest |
| 3,590,658 A | 7/1971 | Tuck |
| 3,596,535 A | 8/1971 | Polak |
| 3,603,176 A | 9/1971 | Tipping et al. |
| 3,612,199 A | 10/1971 | Vissers |
| 3,717,212 A | 2/1973 | Potter |
| 3,901,339 A | 8/1975 | Williamson |
| 3,903,977 A | 9/1975 | Gillette et al. |
| 3,907,051 A | 9/1975 | Weant et al. |
| 3,978,937 A | 9/1976 | Chichester et al. |
| 4,133,404 A | 1/1979 | Griffin |
| 4,174,762 A | 11/1979 | Hopkins et al. |
| 4,245,524 A | 1/1981 | Dammon |
| 4,281,737 A | 8/1981 | Molzahn |
| 4,320,810 A | 3/1982 | Hillman et al. |
| 4,399,882 A | 8/1983 | O'Neill et al. |
| 4,471,669 A | 9/1984 | Seaberg |
| 4,577,711 A | 3/1986 | Butler |
| 4,718,508 A | 1/1988 | Tervola |
| 4,729,257 A | 3/1988 | Nelson |
| 4,732,053 A | 3/1988 | Gleasman et al. |
| 4,738,328 A | 4/1988 | Hayden |
| 4,776,235 A | 10/1988 | Gleasman et al. |
| 4,776,236 A | 10/1988 | Gleasman et al. |
| 4,782,650 A | 11/1988 | Walker |
| 4,790,399 A | 12/1988 | Middlesworth |
| 4,809,796 A | 3/1989 | Yamaoka et al. |
| 4,813,506 A | 3/1989 | Smith |
| 4,875,536 A | 10/1989 | Saur et al. |
| 4,882,947 A | 11/1989 | Barnard |
| 4,895,052 A | 1/1990 | Gleasman et al. |
| 4,917,200 A | 4/1990 | Lucius |
| 4,949,823 A | 8/1990 | Coutant et al. |
| 5,004,060 A | 4/1991 | Barbagli et al. |
| 5,015,221 A | 5/1991 | Smith |
| 5,052,511 A | 10/1991 | Hunt |
| 5,094,326 A | 3/1992 | Schemelin et al. |
| 5,131,483 A | 7/1992 | Parkes |
| RE34,057 E | 9/1992 | Middlesworth |
| 5,195,600 A | 3/1993 | Dorgan |
| 5,279,376 A | 1/1994 | Yang et al. |
| 5,285,866 A | 2/1994 | Ackroyd |
| 5,307,612 A | 5/1994 | Tomiyama et al. |
| 5,314,387 A * | 5/1994 | Hauser et al. ............... 475/74 |
| 5,335,739 A | 8/1994 | Pieterse et al. |
| 5,339,631 A | 8/1994 | Ohashi |
| 5,383,528 A | 1/1995 | Nicol |
| 5,387,161 A | 2/1995 | Shibahata |
| 5,505,279 A | 4/1996 | Louis et al. |
| 5,507,138 A | 4/1996 | Wright et al. |
| 5,517,809 A | 5/1996 | Rich |
| 5,535,840 A | 7/1996 | Ishino et al. |
| 5,553,453 A | 9/1996 | Coutant et al. |
| 5,560,447 A | 10/1996 | Ishii et al. |
| 5,564,518 A | 10/1996 | Ishii et al. |
| 5,644,903 A | 7/1997 | Davis, Jr. |
| 5,649,606 A | 7/1997 | Bebernes et al. |
| 5,667,032 A | 9/1997 | Kamlukin |
| 5,706,907 A | 1/1998 | Unruh |
| 5,722,501 A | 3/1998 | Finch et al. |
| 5,842,378 A | 12/1998 | Zellmer |
| 5,850,886 A | 12/1998 | Kuono et al. |
| 5,894,907 A | 4/1999 | Peter |
| 5,910,060 A | 6/1999 | Blume |
| 5,913,802 A | 6/1999 | Mullet et al. |
| 5,946,894 A | 9/1999 | Eavenson et al. |
| 5,947,219 A | 9/1999 | Peter et al. |
| 5,975,224 A | 11/1999 | Satzler |
| 5,997,425 A | 12/1999 | Coutant et al. |
| 6,026,634 A | 2/2000 | Peter et al. |
| 6,035,959 A | 3/2000 | Schaedler |
| 6,038,840 A | 3/2000 | Ishimori et al. |
| 6,098,737 A | 8/2000 | Aoki |
| 6,126,564 A | 10/2000 | Irikura et al. |
| 6,129,164 A | 10/2000 | Teal et al. |
| 6,141,947 A | 11/2000 | Borling |
| 6,189,641 B1 | 2/2001 | Azuma |
| 6,397,966 B1 * | 6/2002 | Irikura et al. ............... 180/307 |

FOREIGN PATENT DOCUMENTS

| | | |
|---|---|---|
| JP | 57-140277 | 8/1982 |
| JP | 63-227476 | 9/1988 |
| JP | 2-261952 | 10/1990 |
| JP | 6-264976 | 9/1994 |
| JP | 08-142906 | 6/1996 |
| JP | 09-202255 | 8/1997 |
| JP | 09-202258 | 8/1997 |
| JP | 09/202259 | 8/1997 |
| JP | 09-216522 | 8/1997 |
| WO | 92/12889 | 8/1992 |
| WO | WO 98/32645 | 7/1998 |
| WO | 99/40499 | 8/1999 |
| WO | WO 00/01569 | 1/2000 |

OTHER PUBLICATIONS

Electric Tractor Corporation, An Idea Whose Time Has Come, 5 pages, date of publication unknown, published in Ontario, Canada.

Electric Tractor Corporation, Model #9620, The Ultimate Lawn and Garden Tractor, 6 pages. No date.

Popular Science, Tanks and dozers turn on a dime with new all gear steering, pp. 60–62, Jul. 1985.

The Engineer, Tank Steering Mechanisms, pp. 337–340, Mar. 3, 1967.

Excel Industries Inc., U–T–R The Ultimate Turning Radius, pp. 1–6, 1992.

Farm Show Magazine, Battery Powered Riding Mower, 1 page, Mar.–Apr. 1996.

Deere & Company, 240, 245, 260, 265, 285 and 320 Lawn and Garden Tractors Technical Manual, front cover and pp. 10–2 to 10–4 and 10–6, 1996.

Excel Industries Inc., Hustler 4000 Series, pp. 1–8, 1995, published in U.S.A.

Woods Equipment Company, Woods Mow'N Machine, pp. 1–12, 1997, published in U.S.A.

Exmark, Exmark Nobody Does It Better Professional Turf Care Equipment, pp. 1–20, 1997, published in U.S.A.

Dixon Industries Inc., Dixon ZTR Riding Mowers, pp. 1–4, 1997, published in U.S.A.

Shivvers Mfg., Zero Turn Radius Mower The Commercial Clipper, pp. 1–4, 1997, published in U.S.A.

Ferris Industries Inc., The ProCut Z Zero–Turn Rider, pp. 1–2, 1997, published in U.S.A.

Zipper–TS Mower, The Zipper–TS Mowers, pp. 1–2, 1997, published in U.S.A.

* cited by examiner

INTEGRAL-TYPE HYDRAULIC AND MECHANICAL TRANSAXLE APPARATUS FOR DRIVING AND STEERING A VEHICLE

BACKGROUND OF THE INVENTION

1. Field of the Invention

The present invention relates to an integral-type hydraulic and mechanical transaxle apparatus for driving and steering a vehicle comprising a single housing in which a pair of driving axles, a differential mechanism for differentially connecting both the driving axles to each other, two driving and steering hydraulic stepless transmissions ("HSTs" hereinafter) each of which fluidly connects a hydraulic pump and a hydraulic motor, and a mechanical transmission for transmitting outputs of both the hydraulic stepless transmissions to the differential mechanism are accommodated.

2. Related Art

Conventionally, there is a known transaxle structure as disclosed in U.S. Pat. No. 4,782,650 and Japanese Patent Application Laid-open No. H2-261952 for example, in which in order to drive a pair of left and right driving axles for driving a vehicle or a crawler sprocket, and in order to steer both the axles at different driving speeds, one HST for each of the axles, i.e., total two HSTs are used. The two HSTs are arranged such that both output rotational speeds are uniform when the vehicle runs straight, the output rotational speeds are different when the vehicle is steered.

In this conventional mechanism, the output rotational speeds between both the HSTs must be uniformed strictly, and if capacities of both the HSTs are different, turning movement becomes different between a right-hand turn and a left-hand turn. Further, the HSTs for pivotally supporting the axles are provided side-by-side on axes of both left and right axles (i.e., the two HSTs are arranged on the left and the right, side-by-side at central portions in the lateral direction of the vehicle, and both of the axles are extended to the outer sides of the two HSTs in the lateral direction of the vehicle). Therefore, the width of the vehicle is increased and installation space of the HSTs is also limited. If the vehicle width is increased, it is disadvantageous for a vehicle used for operation that requires sharp turning movement.

For this reason, there are increasing tendencies to develop a structure for driving and steering axles in which a pair of axles are connected to each other through a differential mechanism, two HSTs having different functions are provided, and the output of both the HSTs is transmitted to the differential mechanism One of the HSTs (HST for driving operation) is connected to a speed-change operation member such as a lever or pedal provided in the vehicle for rotating both the axles forward and backward, and for steplessly changing the rotational speed based on the operation of the speed-change operation member. The other HST (HST for steering operation) is associatively connected to a steering operation member such as a steering wheel or the like provided in the vehicle for producing different rotational speeds between both the axles based on the steering direction and steering amount of the steering operation member.

In the case of this structure, both the axles are basically driven based on output of the one driving HST, whereby strict factory-operation to uniform the output of two HSTs for ensuring the straight traveling performance is not required unlike the conventional structure. Further, the rotational speeds of both the axles can be changed from each other for steering operation based on the output of the one steering HST. Therefore, unlike the conventional structure, there is no inconvenience that turning radius ratio with respect to the steering angle is changed between the left-hand turning and the right-hand turning due to the difference in capacities between the two HSTs.

Further, both the HSTs need not be arranged side-by-side in the axial direction of the axles, and the HSTs can be disposed in positions that deviate longitudinally from both the axles. Therefore, the vehicle width can be reduced, and this is advantageously applied to a vehicle requiring a sharp turning operation. Further, the flexibility in the layout of the HSTs is excellent.

There are increasing tendencies to develop inventions in which based on such a transaxle structure, a mechanical transmission (drive train) for connecting the output sections of both HSTs with a differential mechanism is accommodated together with both the HSTs in a single housing which accommodates both the axles and the differential mechanism, thereby forming a compact integral-type transaxle apparatus.

There is also a known structure in which a differential mechanism comprises a pair of planetary gear mechanisms and is formed compact, both the output of a driving HST and the output of a steering HST are transmitted to planetary gears of each of the planetary gear mechanisms, and the axle is rotated by revolution of the planetary gear.

However, in the known integral-type transaxle apparatus accommodating all the constituent elements in such a single housing, a pump shaft and a motor shaft of each of the HSTs are in parallel to each other (e.g., both are directed in vertical direction). When the above structure is applied to a lawn mower tractor and the like using an engine whose output shaft is directed in the vertical direction, it is preferable that the pump shaft also serving as an output shaft is directed in the vertical direction. However with this layout, the motor shaft is also directed in the vertical direction. On the other hand, when a gear is used as the input means of the differential mechanism, the axis of the gear is directed in the horizontal direction because of its structure. Therefore, in the mechanical transmission, when a gear train is structured as a drive train from the vertical motor shaft to the differential mechanism, a gear provided on the vertical motor shaft and an input gear of the differential mechanism are twisted with respect to each other, a bevel gear must be provided therebetween and its structure becomes complicated, and installation space must be increased. Further, when the motor shaft is directed in the vertical direction, a hydraulic motor is disposed above or below a center section. Therefore, if a gear train from the motor shaft is structured, the gear train must be disposed in the opposite side from the hydraulic motor shaft with respect to the center section, and the housing must be increased in the vertical direction correspondingly.

Thus, the integral-type transaxle apparatus has a room for further reducing its size.

SUMMARY OF THE INVENTION

It is an object of the present invention to provide an integral-type hydraulic and mechanical transaxle apparatus for driving and steering a vehicle, comprising a single housing accommodating a pair of driving axles, a differential mechanism for differentially connecting both the driving axles, a driving HST and a steering HST, each of the HSTs fluidly connecting a hydraulic pump and a hydraulic motor, and a mechanical transmission for transmitting output of both the HSTs to the differential mechanism, in which structure of the HSTs is devised to reduce a size of the apparatus.

To achieve the above object, in the present invention, at least one of the HSTs is disposed such that a rotational axis of a pump shaft and a rotational axis of a motor shaft are perpendicular to each other. Further, the HST includes a center section which allows such an arrangement of the pump shaft and the motor shaft.

Further, in the HST having the rotational axis of the pump shaft and the rotational axis of the motor shaft perpendicular to each other, a rotational axis of the motor shaft of at least one of the HSTs is disposed horizontally.

With the above structure of the invention, the mechanical transmission formed between the output means of the HST mounted to the motor shaft having the horizontal rotational axis and the input means of the differential mechanism having the (horizontal) rotational axis parallel to both the axles for differentially connecting both the axles requires no change of the power transmitting direction by a bevel gear or the like halfway. Further, there are effects that the rotational axis may be kept horizontal as it is, the structure is simple, the number of parts is reduced, the apparatus is compact and the cost can be cut down.

Further, in the present invention, at least one of the motor shafts having horizontal rotational axis is disposed in parallel to the driving axle. With this structure, the motor shaft is extended in the lateral direction, and the longitudinal length of the apparatus can be shortened.

Further, the motor shaft disposed in parallel to the driving axle is provided with an output member and is directly connected to an input member of the differential mechanism for driving the latter. With this arrangement, it is possible to provide the integral-type transaxle apparatus in which the structure of the mechanical transmission from the motor shaft to the input member of the differential mechanism becomes extremely simple, the number of parts is reduced, the motor shaft can be disposed near the input member of the differential mechanism, the size is compact, and the number of parts is reduced, and the cost can be cut down.

Further, if a center section having substantially a d-shape as seen from the side is used as the center section of the HST having the pump shaft and the motor shaft whose rotational axes are perpendicular to each other, the hydraulic pump and the hydraulic motor whose rotational axes are perpendicular to each other can be disposed side-by-side close to each other. That is, in the HST having the motor shaft including a horizontal rotational axis, if the center section having substantially a d-shape as seen from above is disposed in a state in which the hydraulic pump-mounting face is disposed horizontally and the hydraulic motor-mounting face is disposed vertically, the hydraulic pump and the hydraulic motor can be disposed side-by-side close to each other in the horizontal direction, and there are effects that the HST can be formed compactly, and a compact integral type transaxle apparatus can be formed.

Further, the housing is divided into at least two chambers, where both the HSTs are disposed in at least one chamber, and the differential mechanism and the mechanical transmission are disposed in the chamber other than the at least one chamber in which both the HSTs are disposed. With this structure, impurities such as metal chippings generated from the mechanical transmission or the differential mechanism are prevented from entering into the chamber in which the HSTs are disposed, and the durability of the HSTs can be enhanced.

The above and other objects, features and advantages of the invention will become apparent from the following description of the preferred embodiment taken in conjunction with the accompanying drawings.

DETAILED DESCRIPTION OF THE PREFERRED EMBODIMENTS

Figure 1:
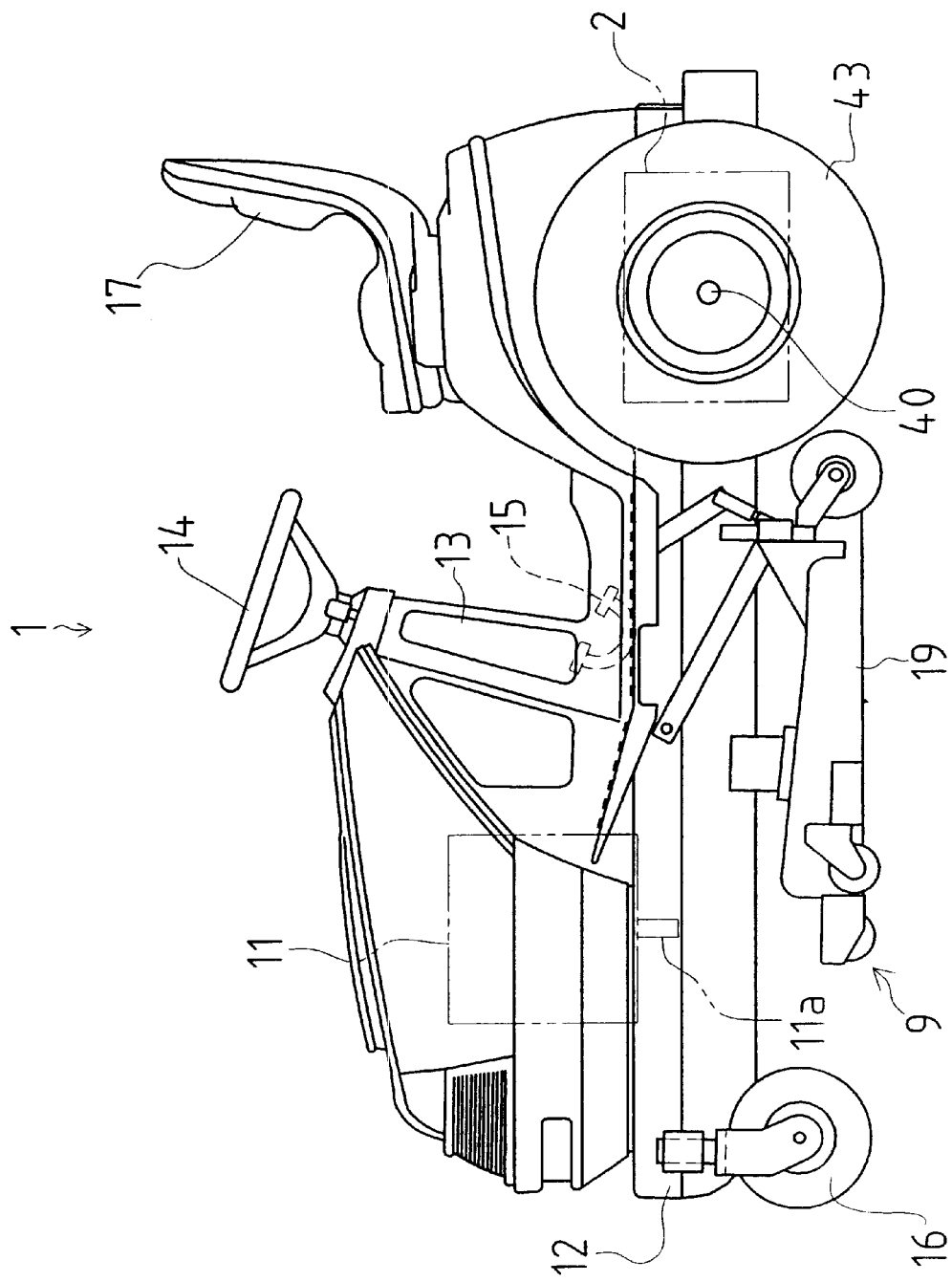
FIG. 1 is an entire side view of a mid-mount type lawnmower tractor 1 having an integral-type transaxle apparatus 2 of the present invention.

First, some embodiments of a lawnmower tractor will be explained as vehicles in which the present invention is applied. A lawnmower tractor 1 shown in FIG. 1 has a front column 13 which is uprightly provided on a front portion of the chassis 12. A steering wheel 14 which is a steering operation member is disposed on the front column 13, and a speed-change pedal 15 and a brake pedal (not shown) as a speed-change operation member are disposed on sides of a footing portion of the lawnmower tractor 1.

The speed-change pedal 15 is of a seesaw type, a medium portion thereof is pivotally supported, its front and rear ends are provided with pedal faces. The speed-change pedal 15 is designed such that if the front pedal face is depressed, the vehicle runs forward, and if the rear pedal face is depressed, and the vehicle runs backward. The running speed of the vehicle corresponds to a downward moving amount of each of the pedal faces. The speed-change pedal 15 is biased to its neutral position by a spring (not shown).

The chassis 12 is provided at its left and right opposite sides of its front lower portion with caster wheels 16 one each as front wheels. Only one caster wheel may be provided at a center portion in the lateral direction, or three or more caster wheels may be provided.

An engine 11 is mounted on a front portion of the chassis 12, and covered with a hood. A seat 17 is disposed on a rear and upper portion of the chassis 12. A mower 9 is vertically provided from a longitudinally medium portion of the chassis 12. Therefore, the lawnmower tractor 1 is of a mid-mount type. In the mower 9, at least one rotation blade is fixed onto a case 19 of the mower 9. The rotation blade is driven by a power of the engine 11 through a power transmitting shaft, a pulley belt or the like (not shown). A link mechanism is provided for vertically moving the mower 9.

An integral-type transaxle apparatus 2 of the present invention is disposed on a rear portion of the chassis 12. The apparatus 2 receives a rotation power of an output shaft 11a directed vertically downward of the engine 11 through a pulley belt and the like (not shown) for driving the left and right axles 40 supported by the rear portion of the chassis 12. Left and right driving wheels 43 as rear wheels are mounted and fixed to the tip ends of the axles 40.

Figure 2:
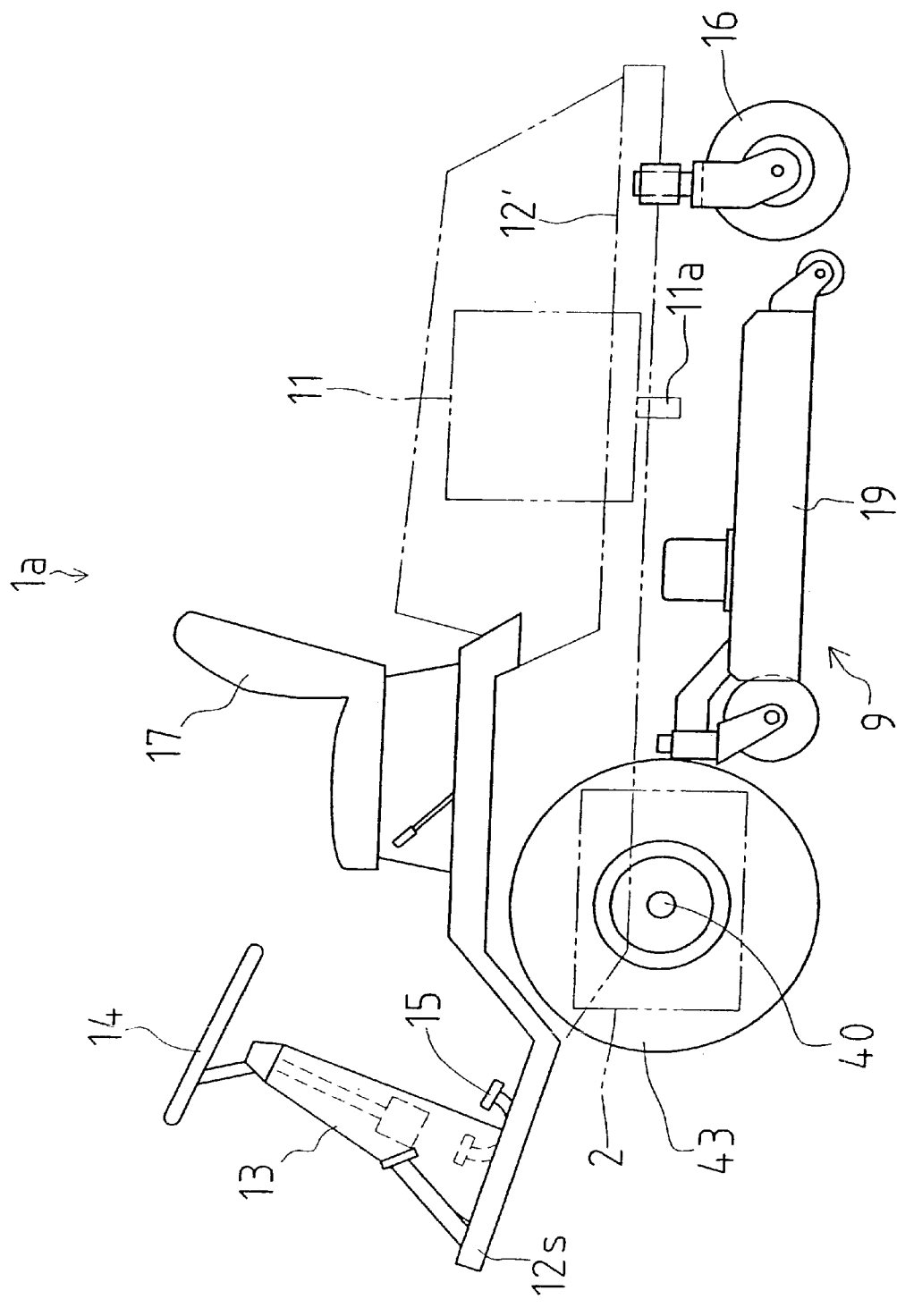
FIG. 2 is an entire side view of an application example of a mid-mount type lawnmower tractor 1a having the same apparatus.

In a lawnmower tractor 1a of a modification shown in FIG. 2, a chassis 12' is formed at its front portion with a platform 12s, and a front column 13 is uprightly disposed on the platform 12s. The front column 13 is provided at its upper portion with the steering wheel 14, the speed-change pedal 15 and the brake pedal are disposed on the platform 12s. Left and right caster wheels 16 as rear wheels are disposed on a rear bottom of the chassis 12'.

The engine 11 having an output shaft 11a which is directed vertically downward is mounted on a rear portion of the chassis 12', and covered with the hood. As in FIG. 1, the mower 9 is suspended downward from a longitudinally medium portion (rearward of the driving wheels 43) of the chassis 12'. Therefore, the lawnmower tractor 1a is of a so-called mid-mount type. A transaxle apparatus 2 disposed on a rear portion of the chassis 12' receives a rotational power of the output shaft 11a through the pulley belt (not shown) for driving the left and right axles 40 supported by the rear portion of the chassis 12'. Left and right driving wheels 43 as front wheels are mounted and fixed to the tip ends of the axles 40.

Figure 3:
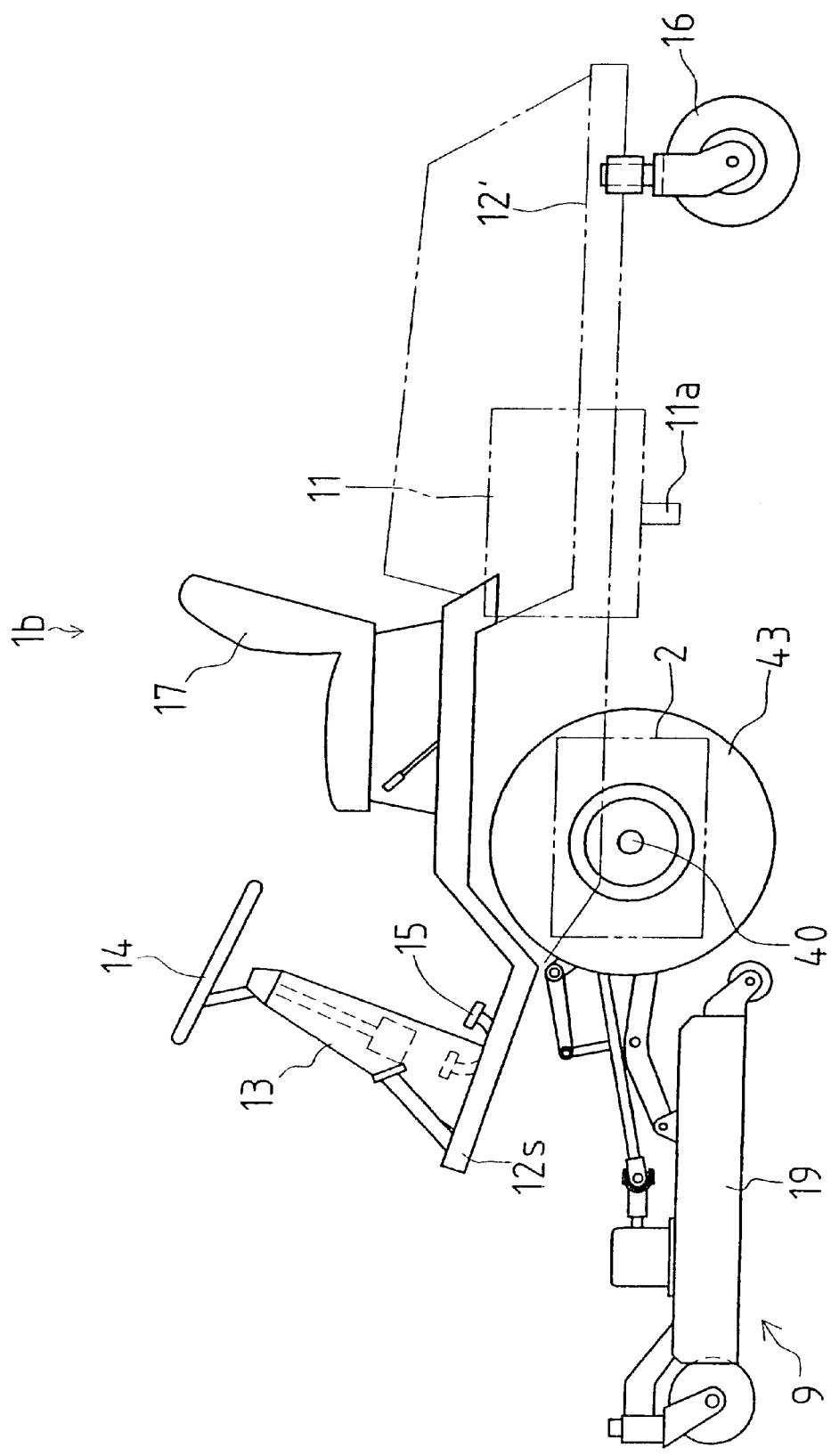
FIG. 3 is an entire side view of another application example of a front-mount type lawnmower tractor 1b having the same apparatus.

FIG. 3 shows a lawnmower tractor 1b according to another modification. The mower 9 is disposed below a front portion of the chassis 12' (in front of the driving wheel 43) and therefore, the lawnmower tractor 1b is of a so-called front-mount type. Other portions are the same as those of the lawnmower tractor 1a.

A structure of the integral-type transaxle apparatus 2 according to the present invention for driving and steering a vehicle such as the lawnmower tractors 1, 1a and 1b will be explained with reference to FIGS. 4 to 16.

Figure 5:
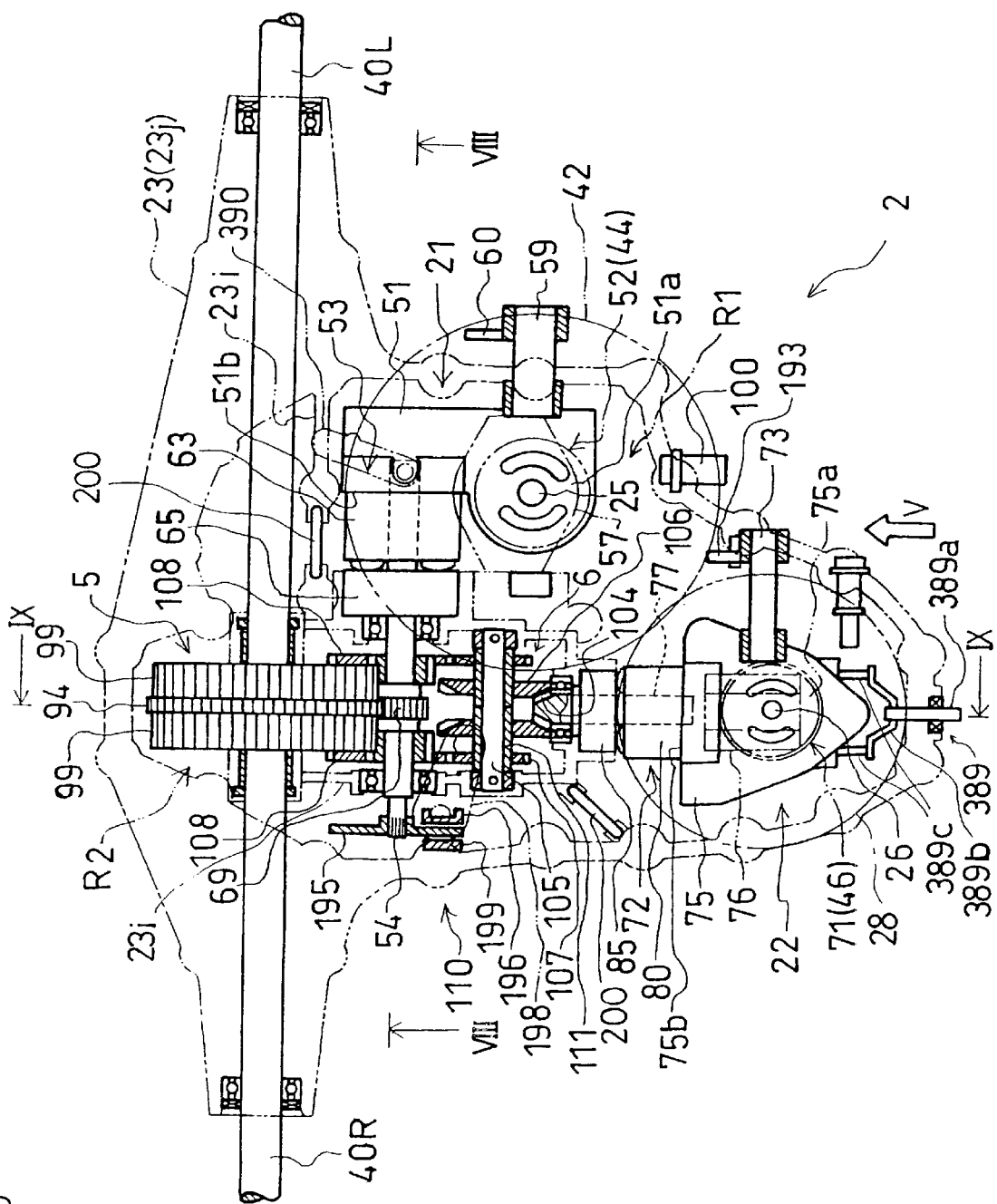
FIG. 5 is a partial sectional plan view of an interior of the apparatus.

As shown in FIG. 5 and the like, the integral-type transaxle apparatus 2 has a common and single integral housing 23 in which the following members are combined and accommodated: a pair of left and right driving axles 40L, 40R; a differential gear unit 5 having planetary gear mechanisms for differentially connecting the axles 40L, 40R; a driving HST 21 for steplessly gear changing the axles 40L, 40R by operation of the speed-change pedal 15 to supply, to the differential gear unit 5, an output for forwardly or backwardly rotating the axles 40L, 40R; a steering HST 22 supplying the output of the driving HST 21 to the differential gear unit 5 as a driving force which causes a difference in rotational speed between the axles 40L and 40R; and the gear transmission 6 comprising a driving gear train for transmitting the output of the driving HST 21 to the differential gear unit 5 and a steering gear train for dividing the output of the steering HST 22 into two lines.

Figure 4:
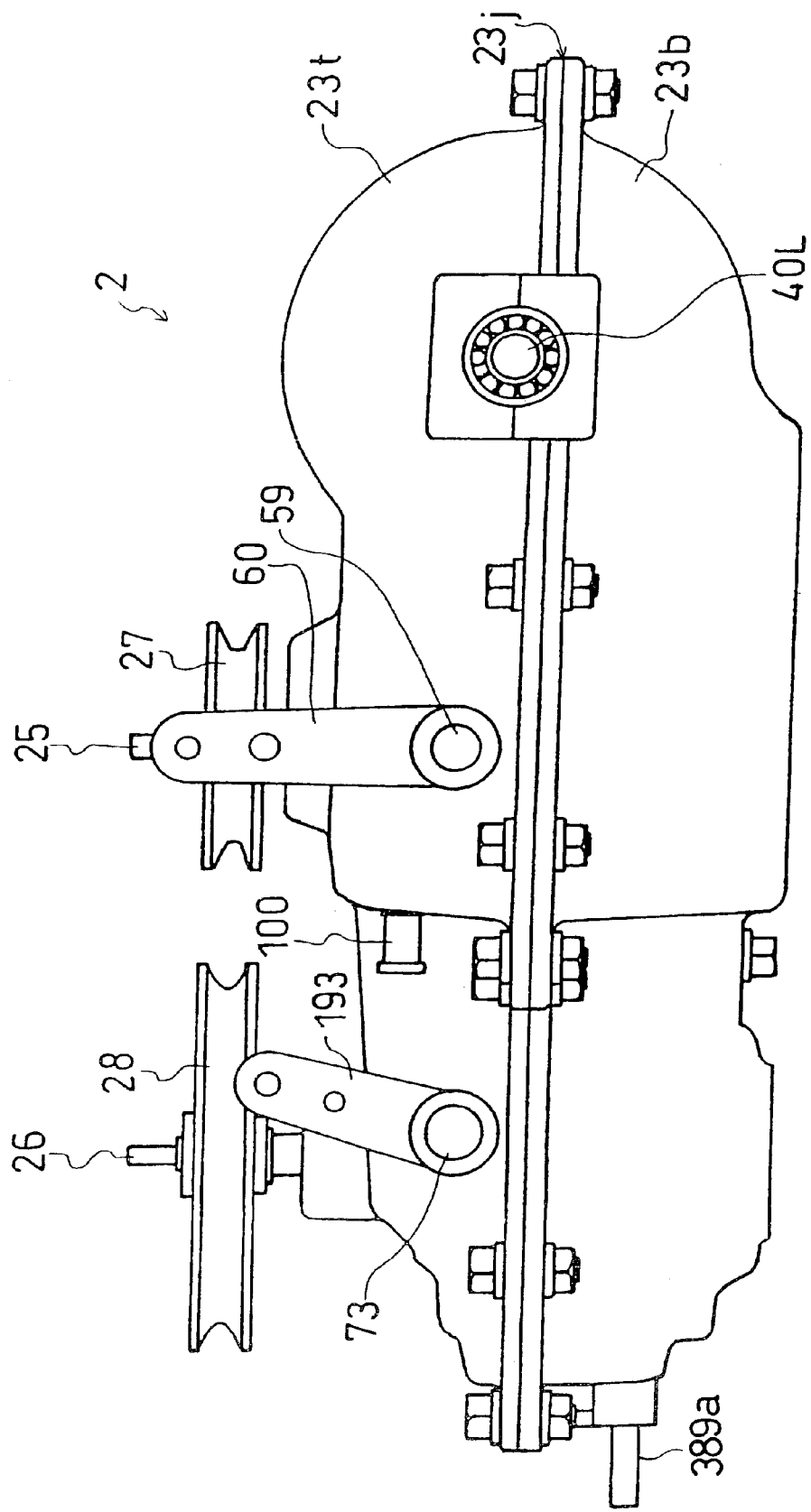
FIG. 4 is a side view of the integral-type transaxle apparatus 2.
Figure 8:
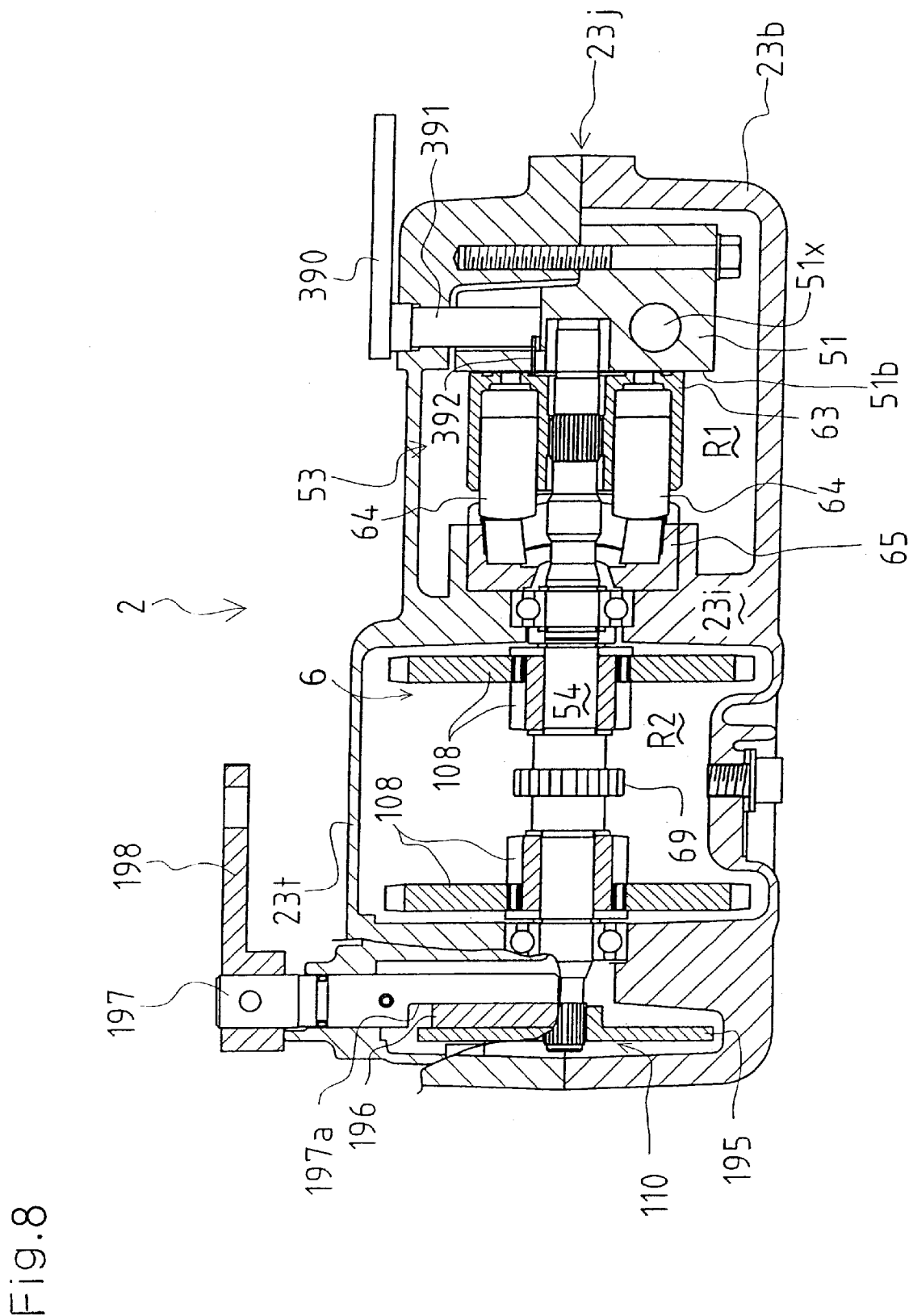
FIG. 8 is a sectional view of the integral-type transaxle apparatus 2 taken along the arrow VIII—VIII in FIG. 5.
Figure 9:
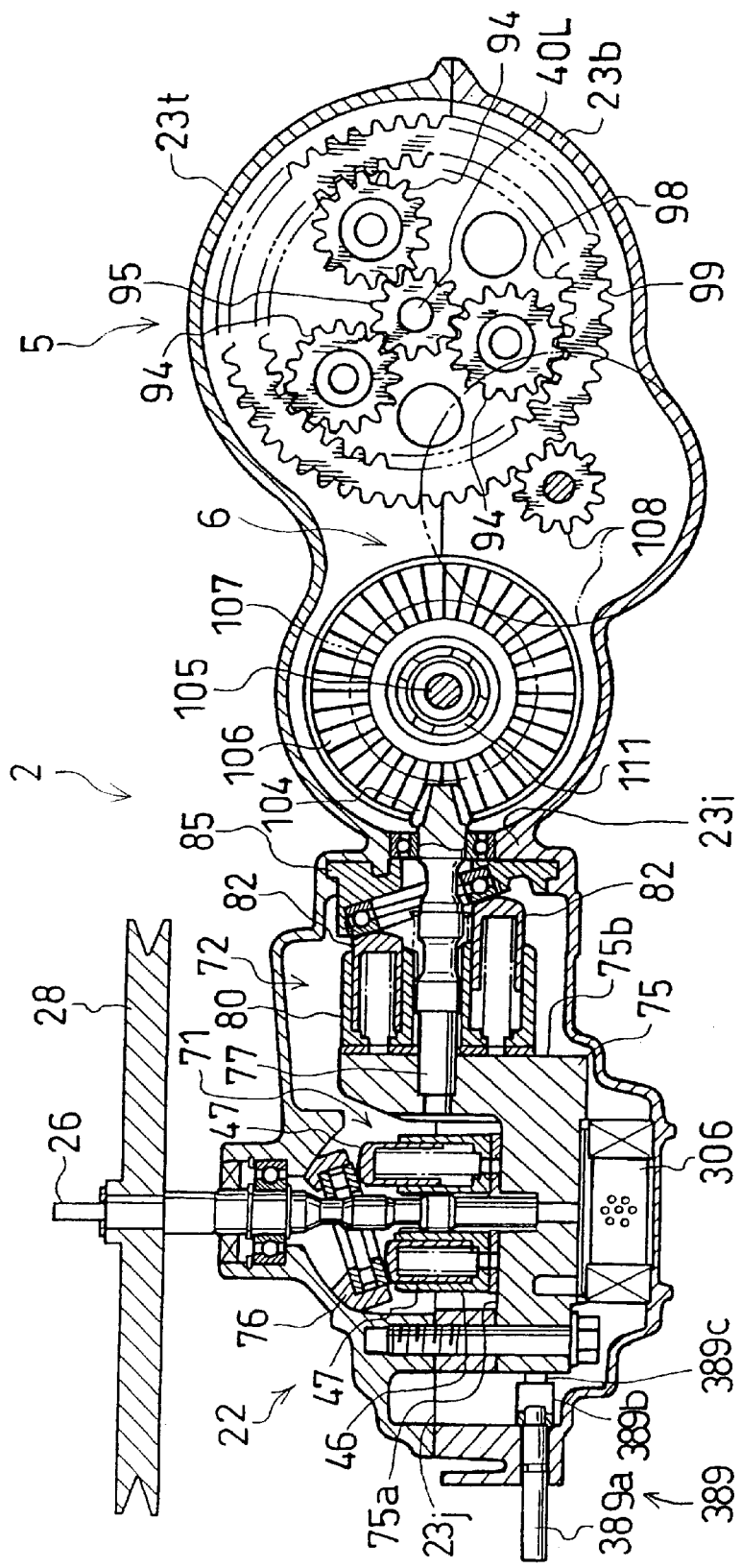
FIG. 9 is a sectional view of the integral-type transaxle apparatus 2 taken along the arrow IX—IX in FIG. 5.

As shown in FIG. 4 and the like, the housing 23 comprises an upper half portion 23t and a lower half portion 23b connected to each other along a horizontal peripheral connecting faces 23j. Bearings for pivotally supporting motor shafts 54, 77 of the HSTs 21, 22 and a pivot 105 are formed by both the half portions 23t, 23b. As shown in FIGS. 8 and 9, axes of the shafts 54, 77 and 105 are horizontally disposed on the connecting face 23j of both the half portions 23t and 23b. As shown in FIGS. 4 and 9, bearings for pivotally supporting the axles 40L and 40R are formed at positions deviated upward from the connecting face 23j.

As shown in FIG. 5 and the like, a partition wall 23i is integrally formed by both the half portions 23t and 23b in the housing 23 to divide the interior space thereof into a first chamber R1 and a second chamber R2. The partition wall 23i also functions as a supporting portion for both the motor shafts 54 and 77, the pivot shaft 105 which is a constituent element of the gear transmission 6, and fixed inclined plates 65, 85 of the HSTs 21, 22. The two HSTs 21, 22 are accommodated in the first chamber R1. Both the axles 40L, 40R, the differential gear unit 5 and the gear transmission 6 are accommodated in the second chamber R2.

As shown in FIG. 5 and the like, the second chamber R2 is formed into substantially a T-shape as viewed from above. An axle-accommodating portion for accommodating the left and right axles 40L, 40R is formed in a rear end of the housing 23 in a substantially lateral direction. An abutting portion between inner ends of both the axles 40L, 40R is formed with an accommodating portion of the differential gear unit 5. An accommodating portion for the gear transmission 6 is extended forwardly from the accommodating portion of the differential gear unit 5. Outer ends of both the axles 40L, 40R respectively project outwardly from left and right ends of the second chamber R2 through left and right outer ends of the housing 23.

An accommodating portion for the driving HST 21 is formed in the first chamber R1 on one side in the lateral direction of the accommodating portion of the gear transmission 6 (right side in the present embodiment as viewed from front). An accommodating portion for the steering HST 22 is formed in front of the accommodating portion of the gear transmission 6.

Figure 6:
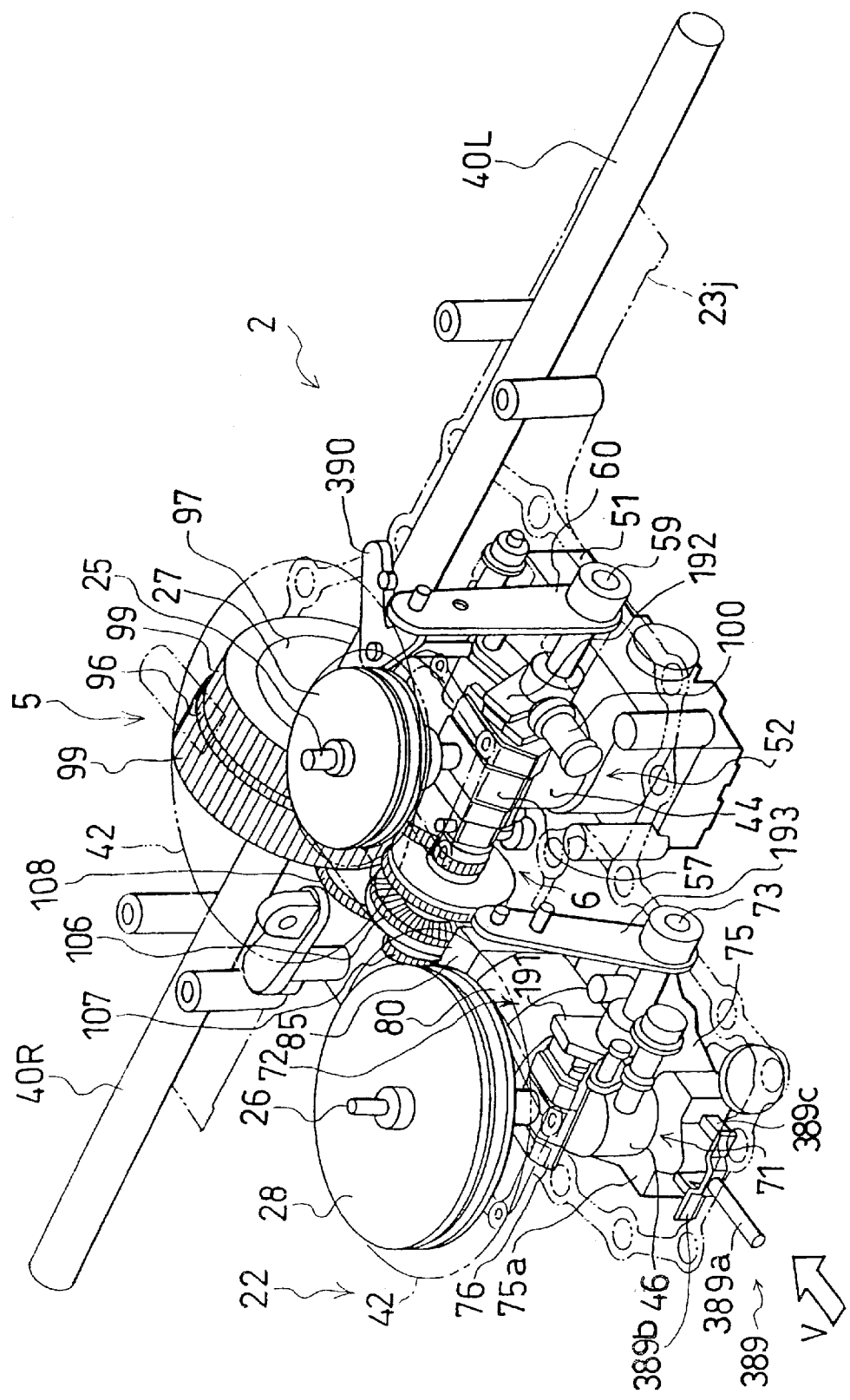
FIG. 6 is an upper perspective view of the apparatus from which a housing 23 is removed.

That is, in FIGS. 5 and 6, an interior of the housing 23 is viewed along a hollow arrow V (front view), the hydraulic pump 52, the hydraulic motor 53, and the center section 51 which constitute the driving HST 21 are superposed on the left axle 40L. The hydraulic pump 71, the hydraulic motor 72 and the center section 75 which constitute the steering HST 22 are superposed on the differential gear unit 5, the right axle 40R, and the gear transmission 6. Since the elements 21, 22, the differential gear unit 5, the gear transmission 6, and both the axles 40L, 40R are distributed in the horizontal direction and not superposed in the vertical direction, it is possible to provide the integral-type transaxle apparatus 2 having a small vertical size.

In the present embodiment, the accommodating portion of the left axle 40L is longer than that of the right axle 40R in the housing 23, and the accommodating portion of the HST 21 of the first chamber R1 is formed in front of the accommodating portion of the right axle 40R. Instead of this structure, it is also possible that the accommodating portion of the right axle 40R is formed longer than that of the left axle 40L, the accommodating portion of the gear transmission 6 and the accommodating portion of the HST 21 of the first chamber R1 are disposed laterally reversely, and the HST 21 is disposed in front of the left axle 40L. In either case, the transaxle apparatus 2 may be disposed in a state in which an axle disposing portion is disposed at front end and the HST 22 is disposed at a rear end in accordance with application condition of the invention to the vehicle.

A communication hole for bringing the first chamber R1 and the second chamber R2 into communication with each other is formed in the partition wall 23i in place. The communication hole is closed with a filter 200. In the present embodiment, as shown in FIG. 5, communication holes closed with filters 200 are disposed between the accommodating portion of the HST 21 of the first chamber R1 and the left axle 40L therebehind, and between the accommodating portion of a brake apparatus 110 formed on right side (left side as viewed from front) of the accommodating portion of the gear transmission 6 in the second chamber R2 and the first chamber R1 in front thereof.

Hydraulic oil of the HSTs 21 and 22 which also serves as lubricant for gear and the like has been charged in the housing 23. The oil flows between both the chambers R1 and R2 through the filter 200 and especially, metal chippings generated by meshing of the gears and floating in the second chamber R2 are prevented from entering into the first chamber R1 which accommodating the HSTs 21 and 22.

Further, as shown in FIG. 4 and the like, a joint 100 projects outward from one side of the upper half portion 23t such that an external oil reservoir disposed outside of the housing 23 is connected to the joint 100 through a tube or the like (not shown).

As shown in FIG. 9, a strainer 306 is suspended from a lower face of the center section 75, and another strainer 306 is also suspended from a lower face of the center section 51. Hydraulic oil in the housing 23 drawn into the center sections 51 and 75 through the strainers 306 is introduced into oil paths 51x and 75x respectively formed in the center sections 51 and 75 through check valve 291 and 292 shown in FIG. 16, thereby compensating leakage of the hydraulic oil of the HSTs 21 and 22.

Figure 16:
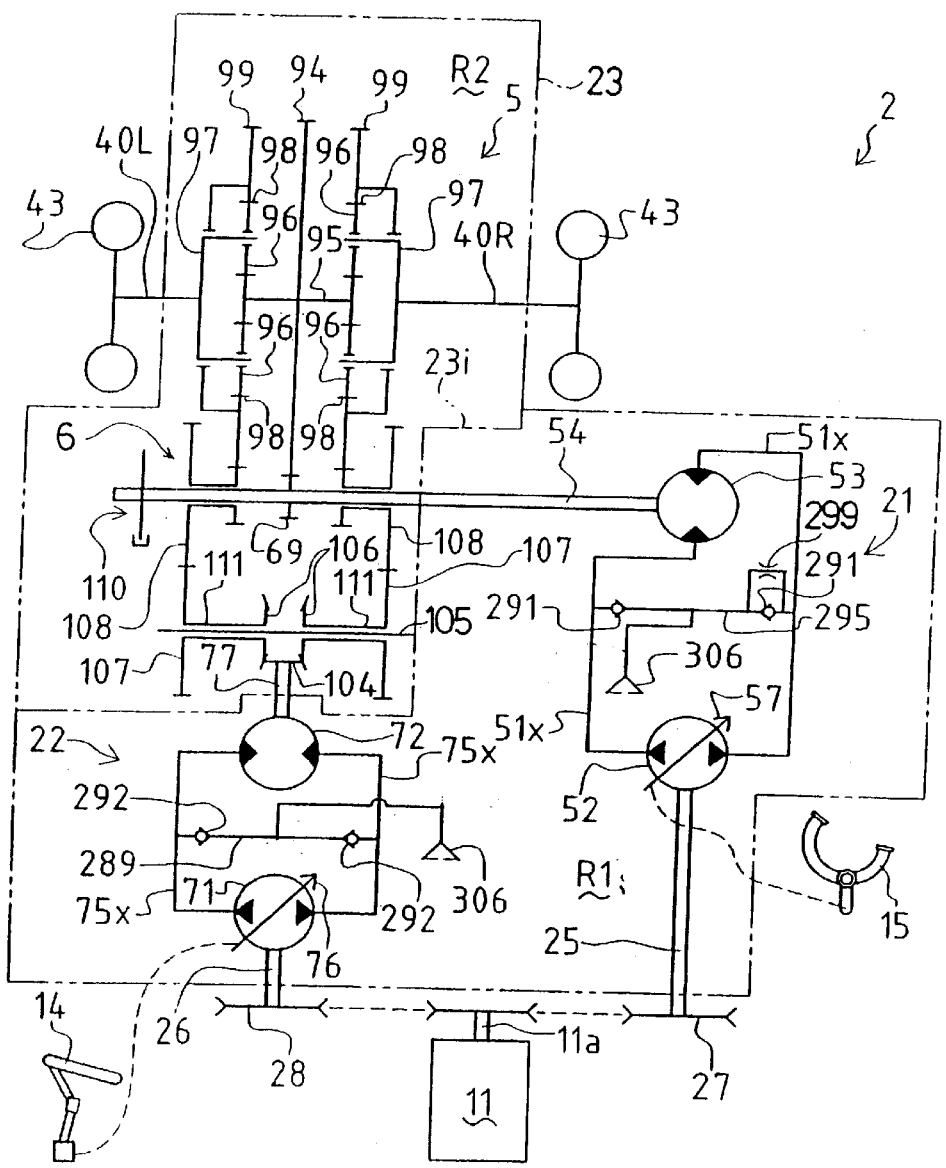
FIG. 16 is a hydraulic circuit diagram of the integral-type transaxle apparatus 2 and a skeleton diagram of a drive train system.

The driving HST 21 will be explained in detail. In the HSTs 21, a variable-capacitance hydraulic pump 52 and a fixed-capacitance hydraulic motor 53 are mounted to the center section 51 as shown in FIGS. 5 to 8 and 10, and the pump 52 and the motor 53 are fluidly connected to each other through a pair of oil paths 51x formed in the center section 51 as shown in FIGS. 8 and 16.

Figure 11:
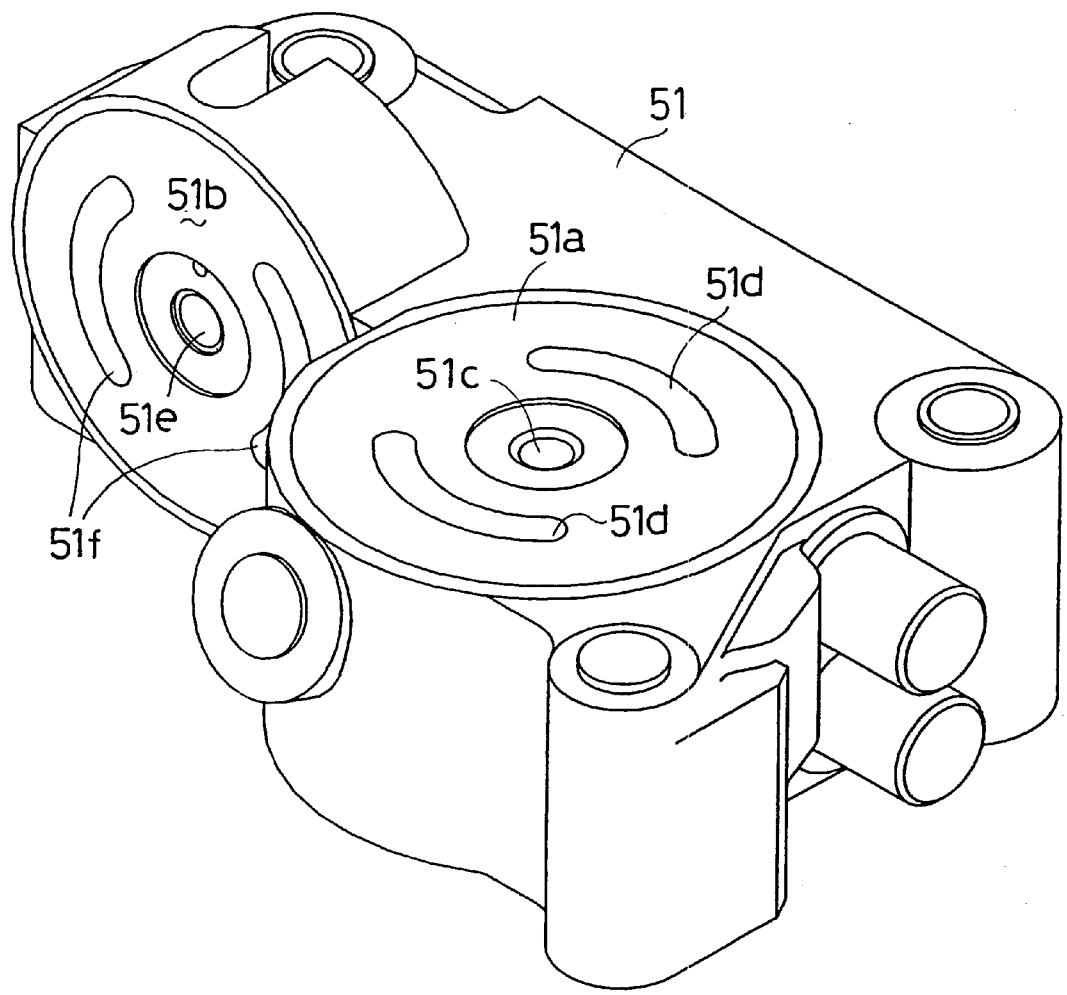
FIG. 11 is a perspective view of a center section 51 for the driving HST 21.

As shown in FIG. 11, the center section 51 includes a pump-mounting face 51a and a motor-mounting face 51b which are perpendicular to each other. If the motor-mounting face 51b is disposed vertically and seen from above, one barrel portion of the center section 51 provided on its top surface with the pump-mounting face 51a projects from the other barrel portion thereof provided on its side surface with the motor-mounting face 51b toward laterally one side, so that both the barrel portions are apparently arranged in substantially a d-shape.

Figure 10:
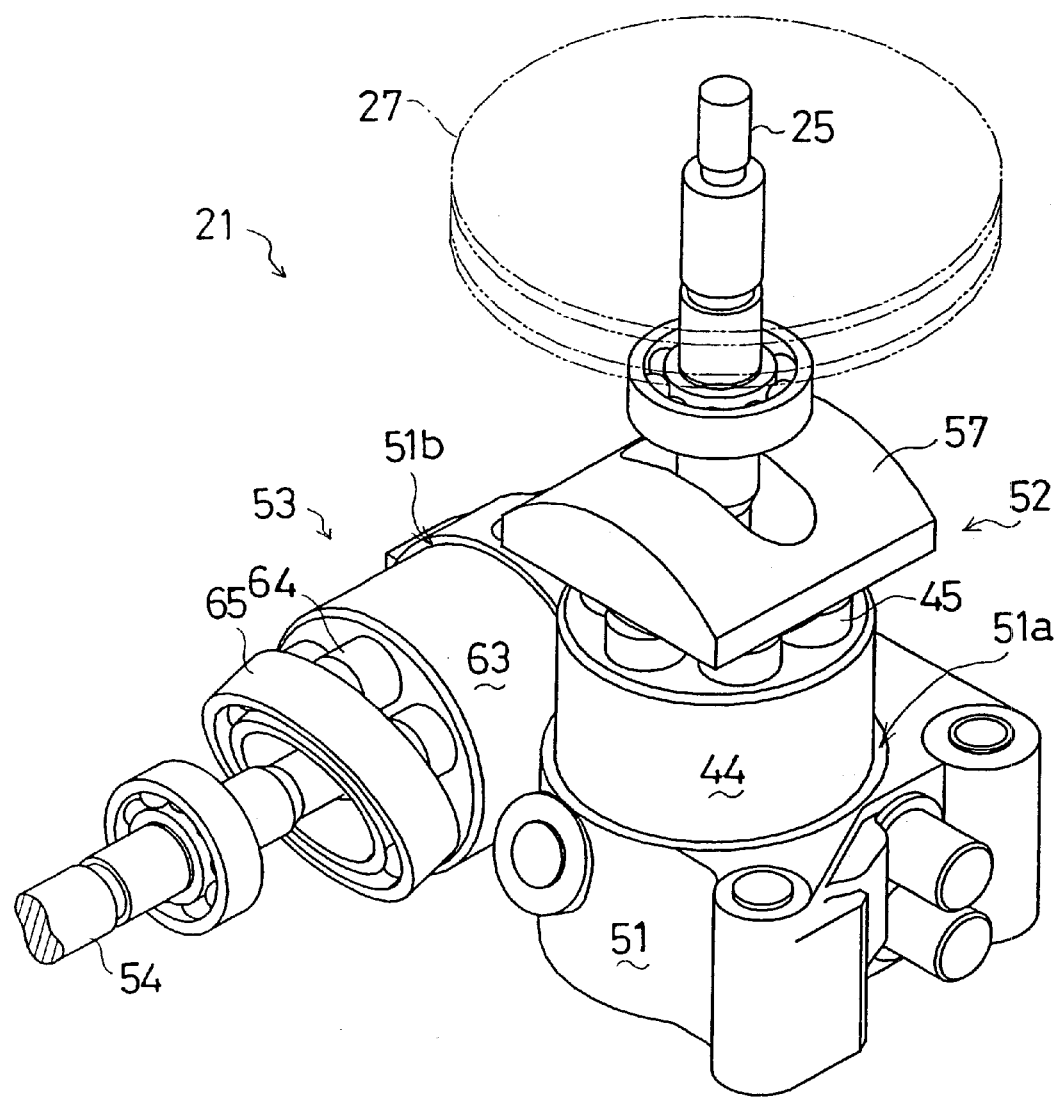
FIG. 10 is a perspective view of a driving HST 21.

The pump-mounting face 51a and the motor-mounting face 51b are in a "twisted" relation in this manner, and both rotational axes of the pump shaft 25 of the hydraulic pump 52 and the motor shaft 54 of the hydraulic motor 53 mounted to the center section 51 through the mounting faces 51a and 51b are perpendicular to each other as shown in FIG. 10 and the like.

As shown in FIG. 11, based on the layout in which the pump-mounting face 51a is disposed horizontally such that the face is directed upward, a center of the pump-mounting face 51a is vertically formed with a shaft hole 51c, a pair of kidney ports 51d are formed such as to surround the shaft hole 51c, and the ports 51d are in communication with the oil paths 51x, respectively. The vertical pump shaft 25 is rotatably inserted in and pivotally supported by the center shaft hole 51c, a cylinder block 44 is rotatably and slidably disposed on the pump-mounting face 51a, and the pump shaft 25 is non-rotatably inserted into and engaged with the center shaft hole of the cylinder block 44. The cylinder block 44 is formed with a plurality of vertical cylinders such as to surround the pump shaft 25. A piston 45 is slidably fitted in each cylinder for reciprocating motion through a biasing spring (not shown), and heads of all the pistons 45 are pushed against and contacted with movable swash plate 57. As shown in FIG. 10 and the like, the variable-capacitance axial piston hydraulic pump 52 is formed on the center section 51. A discharge oil amount and a discharge direction of the hydraulic pump 52 are changed by inclining operation of a variable swash plate 57. A mechanism for this inclining operation of the variable swash plate 57 will be explained later.

Like the pump-mounting face 51a, the motor-mounting face 51b is also formed at its center with a horizontal shaft hole 51e, and a pair of kidney ports 51f are formed such as to surround the shaft hole 51e, and the ports 51f are in communication with the oil paths 51x, respectively. A motor shaft 54 is rotatably inserted into and pivotally supported by the shaft hole 51e in the horizontal direction. A cylinder block 63 is rotatably and slidably mounted on the motor-mounting face 51b, and the motor shaft 54 is non-rotatably inserted into and locked to a center shaft hole of the cylinder block 63. As shown in FIG. 8 and the like, the cylinder block 63 is formed with a plurality of horizontal cylinders such as to surround the motor shaft 54. A piston 64 is slidably fitted in each cylinder for reciprocating motion through a biasing spring (not shown), and heads of all the pistons 64 are pushed against and contacted with a fixed swash plate 65. In this manner, the axial piston type fixed-capacitance hydraulic motor 53 is formed on the side of the center section 51.

In the present embodiment, the driving HST 21 is disposed in its accommodating portion in the first chamber R1 such that in its center section 51, the pump-mounting face 51a is disposed horizontally directed upward as shown in FIG. 5 and the like, and the motor-mounting face 51b is vertically opposed to a left face (right face in FIG. 5) of the accommodating portion of the gear transmission 6 in the second chamber R2.

The movable swash plate 57 is accommodated in a swash plate accommodating recess formed in a ceiling of the upper half portion 23t of the housing 23 (which is the same as the accommodating structure of the movable swash plate 76 for the hydraulic pump 71 of the steering HST 22 shown in FIG. 9). As shown in FIGS. 5 and 8, the fixed swash plate 65 is supported by a left wall of a partition wall 23*i* (right with respect to the accommodating portion of the gear transmission 6 in FIG. 5) surrounding the accommodating portion of the gear transmission 6 in the second chamber R2.

In the driving HST 21 structured as described above, the hydraulic pump 52 and the hydraulic motor 53 mounted to the center section 51 are arranged in the longitudinal direction, and a distance between the pump 52 and the motor 53 is short. If the driving HST 21 in this state is seen along a hollow arrow V shown in FIGS. 5 and 6 (front view), the hydraulic pump 52 and the hydraulic motor 53 are superposed and not deviated in the lateral direction. Portions of the center section 51 where the pair of oil paths 51*x* are formed are disposed such as to extend in the longitudinal direction on one side (left side in the present embodiment, shown rightward in FIG. 5) in the lateral direction of the longitudinally arranged hydraulic pump 52 and the hydraulic motor 53. Therefore, vertical and lateral sizes of the driving HST 21 are suppressed and the driving HST 21 is structured compactly, which reduces the transaxle apparatus 2 in size.

As shown in FIGS. 4, 6 and the like, the pump shaft 25 passes through the movable swash plate 57 and projects upward of the housing 23. An input pulley 27 is fixed to the upwardly projecting portion of the pump shaft 25, and is connected to output pulley fixed to the output shaft 11*a* of the engine 11 through a belt as shown in FIG. 16. The pump shaft 25 is used as an input shaft of the HST 21. As shown with chain lines in FIGS. 5 and 6, a cooling fan 42 may be fixed to an outwardly projecting portion of the pump shaft 25.

As shown in FIGS. 5 to 8 and the like, the motor shaft 54 is disposed horizontally in parallel to the axles 40L, 40R, passes through the fixed swash plate 65 and the partition wall 23*i* and is extended into the second chamber R2. The motor shaft 54 passes through the accommodating portion of the gear transmission 6 in the second chamber R2, and a tip end of the motor shaft 54 is inserted in an accommodating portion of the brake apparatus 110 formed on the right side (left side in FIG. 5) of the accommodating portion of the gear transmission 6.

In the accommodating portion of the gear transmission 6, a drive gear 69 is formed on a medium portion of the motor shaft 54. The drive gear 69 is directly meshed with a center gear 94 serving as an input gear of a driving gear system in the planet gear mechanism constituted by the differential gear unit 5, thereby forming the driving gear train which transmits an output of the HST 21 to the differential gear unit 5. In the present invention, the motor shaft 54 which is the output shaft of the HST 21 is disposed in parallel to the axle 40L by horizontally disposing the hydraulic motor 53 of the HST 21 in parallel to the axles 40L and 40R in this manner. Therefore, the driving gear train constituted between the HST 21 and the differential gear unit 5 is constituted only by the two meshing gears 69 and 94; the drive gear 69 formed on the motor shaft 54; and the center gear 94 serving as the input gear of the driving gear system, so that the apparatus becomes compact. Further, since the gears 69 and 94 are meshed with each other in the longitudinal direction, the transaxle apparatus 2 becomes compact, and its vertical size can be reduced.

Figure 7:
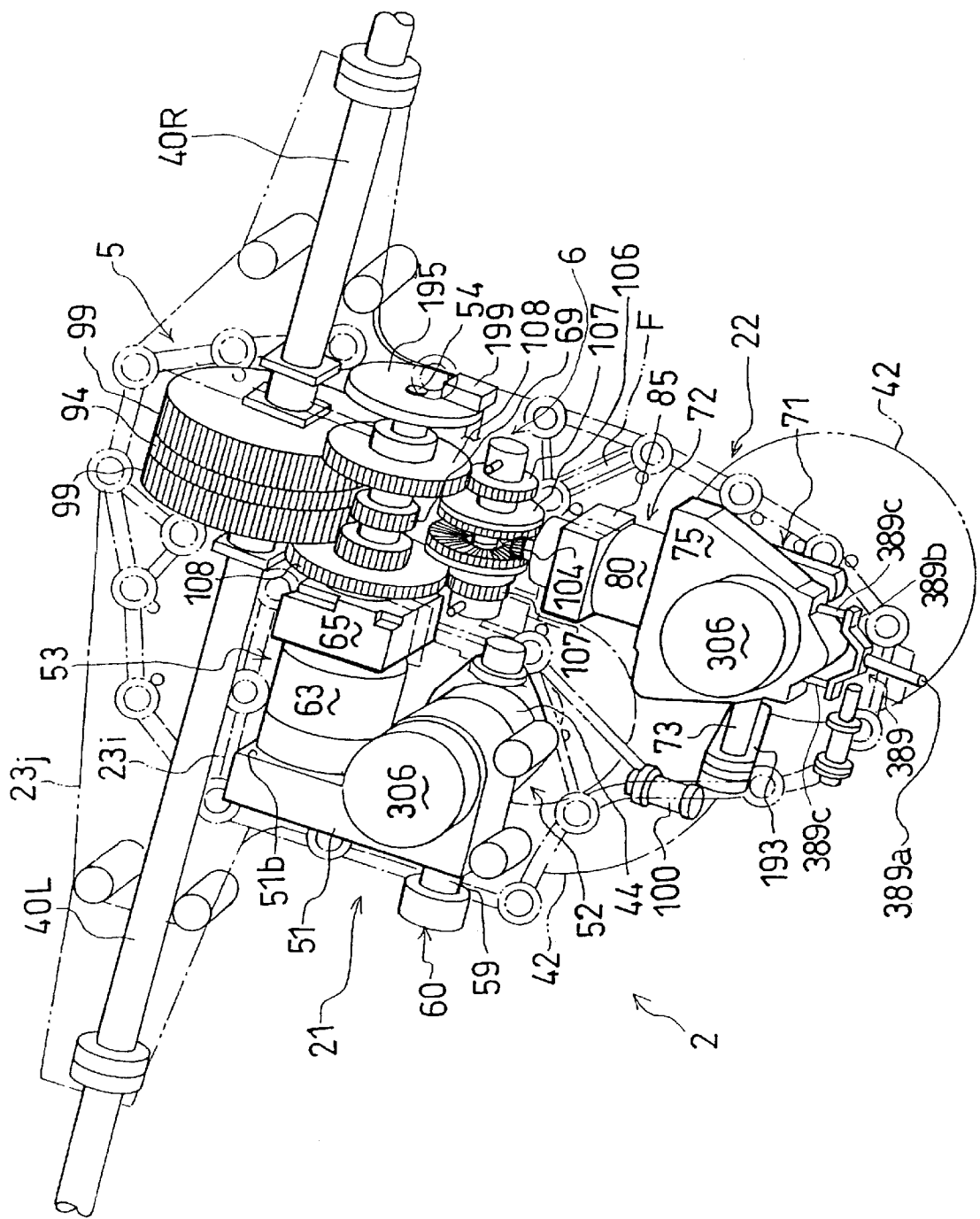
FIG. 7 is a lower perspective view of the apparatus.

A structure of the brake apparatus 110 will be explained. As shown in FIGS. 5, 7, 8 and the like, a brake disk 195 is relatively non-rotatably but slidably mounted to a tip end portion of the motor shaft 54, and a brake pad 199 is interposed between the brake disk 195 and the housing 23. A brake control shaft 197 is vertically disposed on the opposite side from the brake pad 199 with respect to the brake disk 195. A portion of the brake control shaft 197 opposed to the brake disk 195 is notched to form a cam face 197*a*. A brake pad 196 is interposed between the cam face 197*a* and the brake disk 195. An upper end of the brake control shaft 197 projects upward from the upper half portion 23*t* of the housing 23, and a base end of a brake control lever 198 is fixed to this projecting portion of the brake control shaft 197.

The brake control lever 198 is connected to the brake pedal through a link or the like. If the brake pedal is depressed, the brake control lever 198 is turned and with this turning motion, the brake control shaft 197 is turned in unison so that a cam formed on a vertical edge end of the cam face 197*a* pushes the brake disk 195 through the brake pad 196. With this motion, the brake disk 195 slides on the motor shaft 54 toward the tip end of the motor shaft 54, and is pushed against an inner wall face of the housing 23 through the brake pad 199. By sandwiching the brake disk 195 between the cam portion of the brake control shaft 197 and the inner wall face of the housing 23 through the brake pads 196 and 199 in this manner, the motor shaft 54 is braked to brake the axles 40L and 40R.

Figure 17:
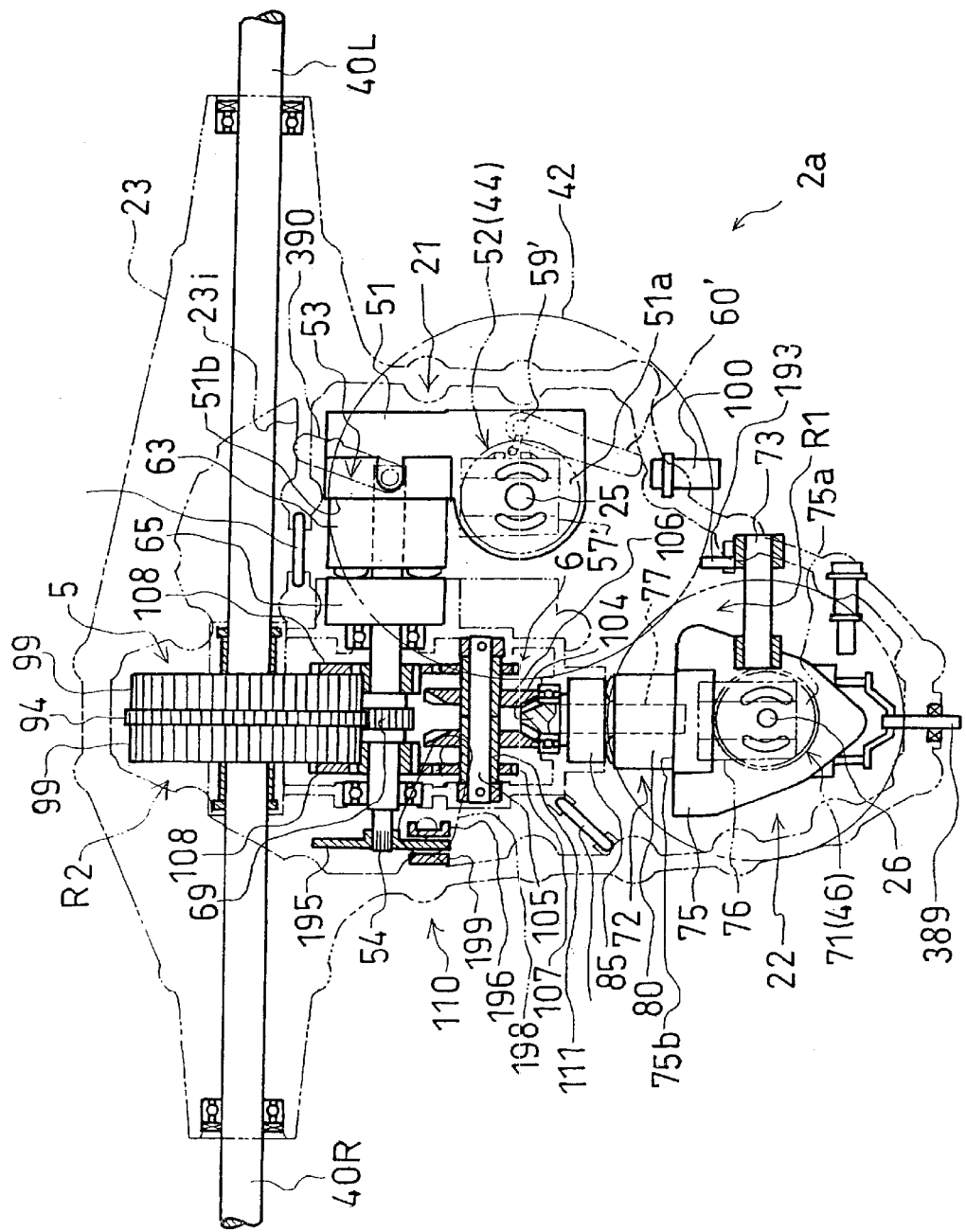
FIG. 17 is a partial sectional plan view of an interior of an integral-type transaxle apparatus 2a in which a form of the center section of the steering HST 22 is changed and its input is obtained from an input shaft of the driving HST 21.

The inclining mechanism of the movable swash plate 57 of the hydraulic pump 52 will be explained. As shown in FIGS. 4 to 6 and the like, a speed-change control shaft 59 is supported in parallel to the axles 40L and 40R by a side wall of the housing 23 which is disposed on the left side (right side in FIG. 5) opposite from the brake apparatus 110. In the housing 23, an arm 192 is fixed onto an inner end of the speed-change control shaft 59, and the movable swash plate 57 is connected to the tip end of the arm 192 as shown in FIG. 6. Although the movable swash plate 57 is of a so-called cradle type, a trunnion-type movable swash plate may be used instead of the cradle type plate to form an integral-type transaxle apparatus 2*a* as shown in FIG. 17 which will be described later.

On the other hand, As shown in FIGS. 4 to 6, a speed-change control lever 60 is fixed on the speed-change control shaft 59 outside of housing 23. The speed-change control lever 60 is connected to speed-change operating means (the speed-change pedal 15 in the present embodiment) such as a lever or a pedal through a link mechanism or the like.

A running direction (forward or backward) and a running speed are set by depressing the speed-change pedal 15, and based on this depressing operation, the speed-change control lever 60, the speed-change control shaft 59, and the arm 192 are turned in unison, and the movable swash plate 57 is inclined to a position corresponding to a set position of the speed-change pedal 15. The discharge direction and the discharge oil amount of the hydraulic oil from the hydraulic pump 52 are determined, the hydraulic oil is circulated between the hydraulic pump 52 and the hydraulic motor 53 through the pair of oil paths 51*x* in the center section 51, and the hydraulic motor 53 is driven to rotate the motor shaft 54 in the set rotation direction and at the set rotation speed.

A hydraulic pressure circuit in the center section 51 will be explained with reference to FIGS. 16 and the like. Both the oil paths 51*x* are in communication with a common intake path 295 which sucks hydraulic oil into the center section 51 by the strainer 306 through check valves 291. Each of the check valves 291 is a check valve that is opened only when the hydraulic oil is sucked to prevent the hydraulic oil from leaking from the intake path 295.

A bypass circuit in parallel to the check valves 291 bypassing a choke 299 is provided between the intake path 295 (or an oil reservoir in the housing 23) and one of the oil paths 51x which is pressured higher than the other when the vehicle runs backward. The choke 299 opens through a distance between a neutral position of the movable swash plate 57 and a position slightly deviated toward the backward running side. With this design, when the movable swash plate 57 is slightly deviated toward the backward running side from the correct neutral position due to setting error of the link mechanism or the like even through the speed-change pedal 15 set to the neutral position (i.e., in a state in which the pedal is not depressed neither in forward running side nor backward running side), the bypass circuit is opened, and the hydraulic oil is drained from the higher-pressured oil path 51x through the choke 299. With this design, creep phenomenon is prevented, the neutral position is enlarged toward the backward side, and the factory-adjustment of output becomes easy. That is, even if the movable swash plate 57 is not in the neutral position strictly, the hydraulic pump 52 can stay in the neutral condition up to the position slightly deviated toward the backward side, and accuracy required for interposing the link mechanism between the speed-change pedal 15 and the speed-change control lever 60 is moderated.

Instead of, or in addition to the bypass circuit, another bypass circuit having a choke which opens through a distance between a neutral position of the movable swash plate 57 and a position slightly deviated toward the forward running side may be disposed in parallel to the check valves 291 between the oil path 51x whose pressure is increased when the vehicle runs forward and the intake path 295 (or the oil reservoir in the housing 23) and with this, the hydraulic pump 52 can stay in the neutral condition even if the movable swash plate 57 was slightly deviated from the neutral position toward the forward running side.

A drain control lever 390 and a drain control shaft 391 shown in FIG. 8 are for making it possible to idle the motor shaft 54 by draining the hydraulic oil in both the oil paths 51x of the center section 51 so that when a vehicle to which the transaxle apparatus 2 is applied is towed, the pulling resistance of the vehicle can be reduced. When the drain control shaft 391 is seen from the longitudinal direction as shown in FIG. 8, the drain control shaft 391 is vertically disposed in parallel to the motor-mounting face 51b of the center section 51, and rotatably supported by an upper end of the upper half portion 23t of the housing 23 and the center section 51. An upper end of the drain control shaft 391 projects upward from the upper half portion 23t of the housing 23, and a base end of the drain control lever 390 is fixed to this projecting end of the drain control shaft 391. The drain control shaft 391 is formed at its lower end with a cam. Further, a pushing pin 392 is disposed in the vicinity of the motor shaft 54 for sliding motion in a direction in parallel to the motor shaft 54. One end of the pushing pin 392 is directed to a cam provided on a lower end of the drain control shaft 391, and the other end thereof is directed to the cylinder block 63. The motor-mounting face 51b is formed with an opening so that the pushing pin 392 can project toward the cylinder block 63 (the opening is omitted in FIG. 11).

Usually, the pushing pin 392 is out of contact with the cam, and its outer end does not project from the motor-mounting face 51b. If the drain control lever 390 is turned from this state, the drain control shaft 391 is turned in unison, the cam located in a lower end of the drain control shaft 391 pushes the pushing pin 392 toward the cylinder block 63, the pushing pin 392 projects from the motor-mounting face 51b to push the cylinder block 63, and the cylinder block 63 is separated from the motor-mounting face 51b. With this design, the hydraulic oil in both the oil paths 51x is drained into the oil reservoir in the housing 23 through the kidney ports 51f of the motor-mounting face 51b, and the hydraulic motor 53 can idle.

Next, the steering HST 22 will be explained in detail. As shown in FIGS. 5 to 7 and 9 and 12, the variable-capacitance hydraulic pump 71 and the fix-capacitance hydraulic motor 72 are mounted to the center section 75, and the hydraulic pump 71 and the hydraulic motor 72 are fluidly connected through a pair of oil paths 75x formed in the center section 75 as shown in FIG. 16.

Figure 12:
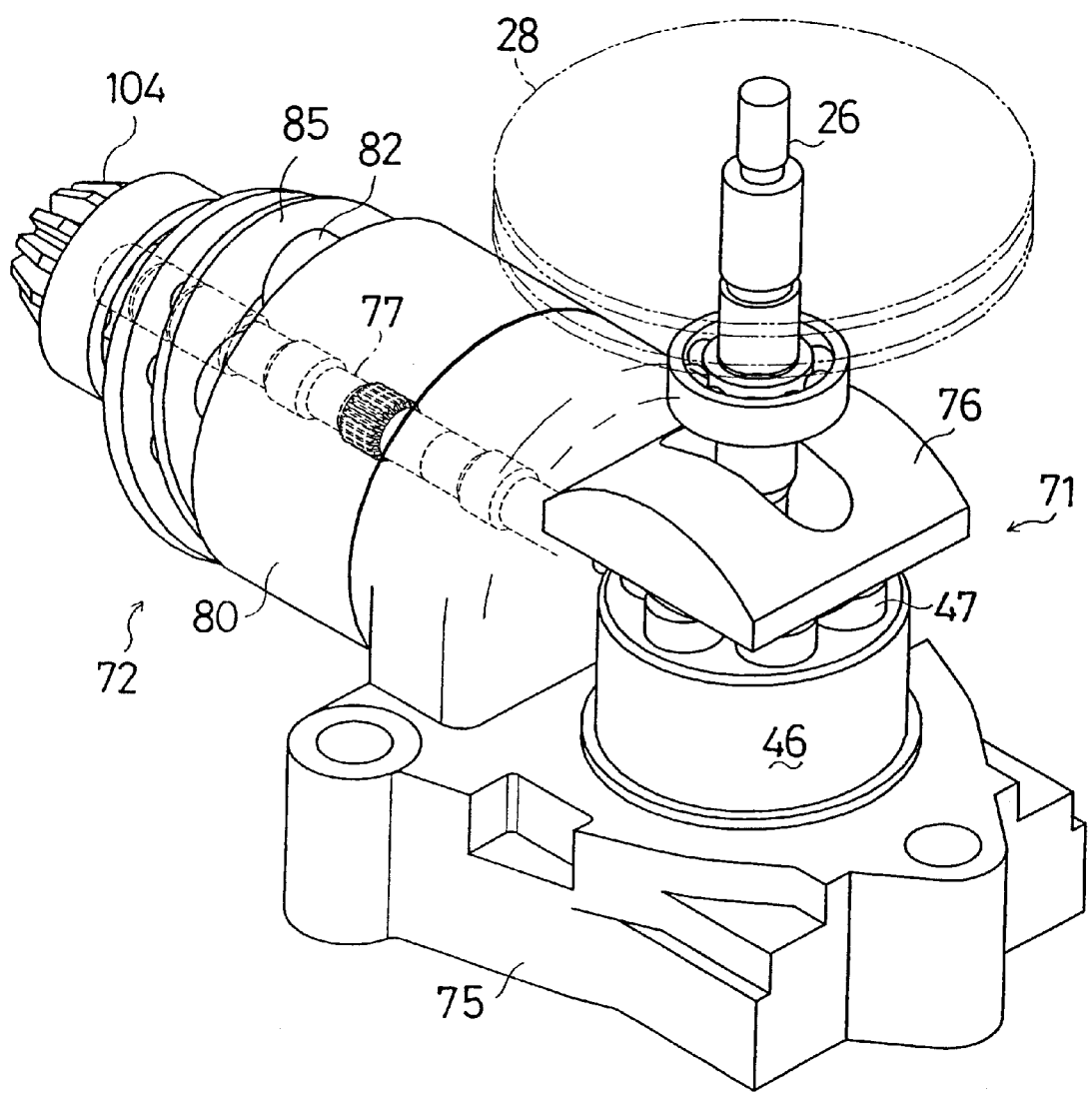
FIG. 12 is a perspective view of a steering HST 22.
Figure 13:
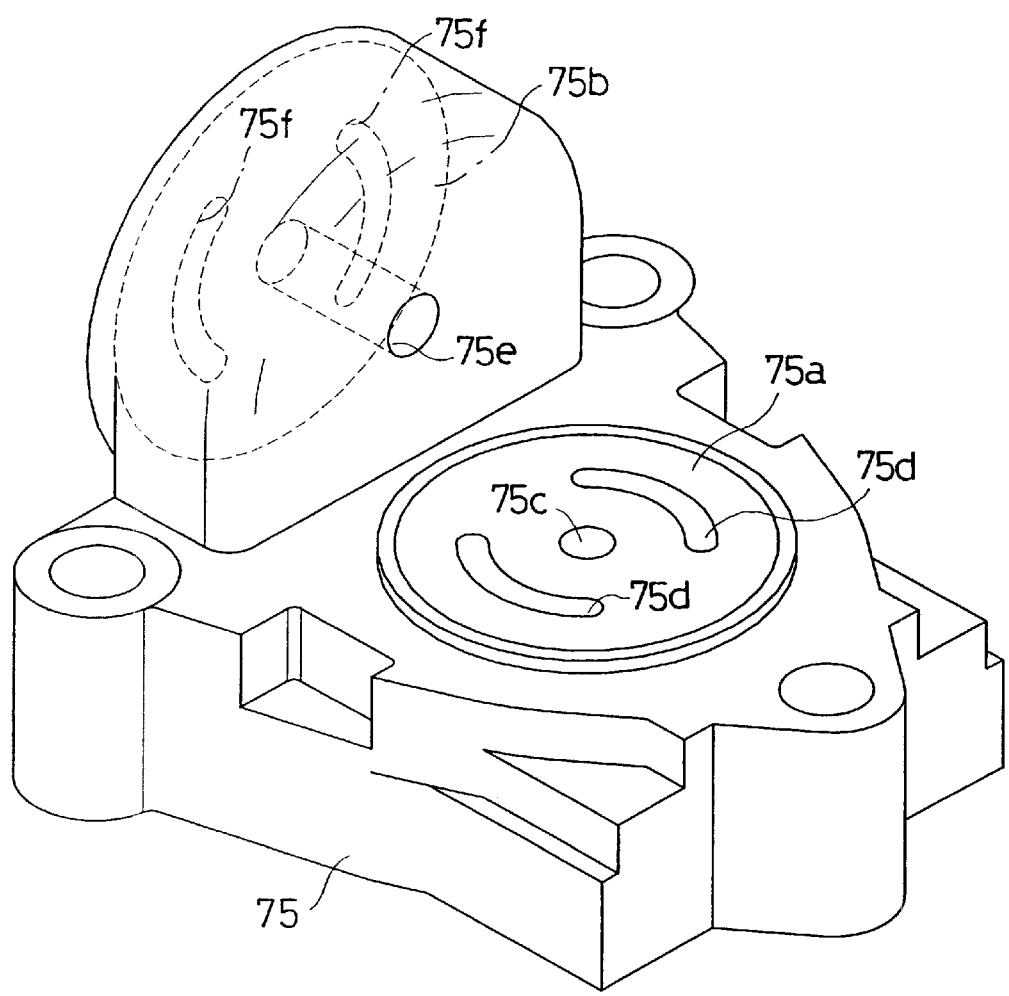
FIG. 13 is a perspective view of a center section 75 for the steering HST 22.

As shown in FIG. 13, the center section 75 includes a pump-mounting face 75a and a motor-mounting face 75b which are directed perpendicular to each other. If the motor-mounting face 75b is vertically disposed and its side sectional view is seen, one barrel portion of the center section 75 provided on its top surface with the pump-mounting face 75a and the other barrel portion thereof provided on its side surface with the motor-mounting face 75b form substantially a right angle L-shape. Therefore, both rotational axes of the pump shaft 26 of the hydraulic pump 71 and the motor shaft 77 of the hydraulic motor 72 mounted to the center section 75 through the mounting faces 75a and 75b are perpendicular to each other as shown in FIGS. 9, 12 and the like.

As shown in FIG. 13, based on a state in which the pump-mounting face 75a is directed upward and disposed horizontally, the pump-mounting face 75a is formed at its center with a shaft hole 75c directed in the vertical direction, a pair of kidney ports 75d are formed such as to surround the shaft hole 75c, and both the kidney ports 75d are in communication with the oil paths 75x, respectively. The vertical pump shaft 26 is rotatably inserted into and pivotally supported by the center shaft hole 75c, a cylinder block 46 is rotatably and slidably disposed on the pump-mounting face 75a, and the pump shaft 26 is relatively non-rotatably inserted into and locked to the center shaft hole of the cylinder block 46. A plurality of vertical cylinders are formed in the cylinder block 46 such as to surround the pump shaft 26, a piston 47 is slidably fitted in each cylinder through a biasing spring (not shown) for reciprocating motion, and heads of all the pistons 47 are pushed and brought into contact with the movable swash plate 76. In this manner, the variable-capacitance axial piston hydraulic pump 71 is formed on the center section 75 as shown in FIGS. 12 and the like. The discharge oil amount and the discharge direction of the hydraulic pump 71 are changed by the inclining operation of the variable swash plate 76. This inclining operation of the movable swash plate 76 will be described later.

Like the pump-mounting face 75a, the motor-mounting face 75b is formed at its center with a horizontal shaft hole 75e, and with a pair of kidney ports 75f formed such as to surround the shaft hole 75e, and the kidney ports 75f are in communication with the oil paths 75x, respectively. The motor shaft 77 is rotatably inserted into and pivotally supported horizontally into the center shaft hole 75e. A cylinder block 80 is rotatably and slidably mounted to the motor-mounting face 75b, and the motor shaft 77 is relatively non-rotatably inserted into and locked to a center shaft hole of the cylinder block 80. As shown in FIGS. 9 and the like, the cylinder block 80 is formed with a plurality of horizontal cylinders such as to surround the motor shaft 77, a piston 82 is slidably fitted in each the cylinder for reciprocating motion through a biasing spring (not shown). Heads of all the pistons 82 are pushed and brought into contact with the fixed swash plate 85. In this manner, the fix-capacitance axial piston hydraulic motor 72 is formed on the side of the center section 75.

In the present embodiment, when the steering HST 22 is disposed in its accommodating portion in the first chamber R1, its center section 75 is disposed as shown in FIGS. 5 and the like in a state in which the pump-mounting face 75a is directed upward horizontally, and the motor-mounting face 75b is directed vertically such as to be opposed to a front face of the accommodating portion of the gear transmission 6 in the second chamber R2.

As shown in FIG. 9, the movable swash plate 76 is tiltably accommodated in the swash plate-accommodating recess formed in the ceiling of the upper half portion 23t of the housing 23. As shown in FIGS. 5 and 9, the fixed swash plate 85 is supported by the front wall of the partition wall 23i which surrounds the accommodating portion of the gear transmission 6 in the second chamber R2.

As shown in FIGS. 4, 6 and the like, the pump shaft 26 passes through the movable swash plate 76 and projects above the housing 23, an input pulley 28 is fixed to this upwardly projecting portion of the pump shaft 26 and is connected to an output pulley fixed to the output shaft 11a of the engine 11 through a belt as shown in FIG. 16. The pump shaft 26 is used as the input shaft of the HST 22 in this manner. A cooling fan 42 may be fixed to the outwardly projecting portion of the pump shaft 26 as shown with the chain line in FIG. 6.

On the other hand, as shown in FIGS. 5, 9 and the like, the motor shaft 77 passes through the fixed swash plate 85 and extends horizontally rearward, and its rear end is disposed in the accommodating portion of the gear transmission 6 in the second chamber R2. The rear end of the motor shaft 77 is formed with a bevel gear 104. A dual steering gear train is formed as portions of the gear transmission 6 from the bevel gear 104 to the left and right ring gears 99 of the differential gear unit 5. The steering gear train from the motor shaft 77 which is the output shaft of the steering HST 22 to the differential gear unit 5 is the motor shaft 77 extended in the longitudinal and horizontal direction. Therefore, the steering gear train is formed between the motor shaft 77 and the differential gear unit 5 which is disposed behind the motor shaft 77 and thus, its vertical size is small, and the height of the transaxle apparatus 2 is reduced. This steering gear train will be described in detail later.

The inclining mechanism of the movable swash plate 76 of the hydraulic pump 71 will be explained. As shown in FIGS. 4 to 6, a steering-control shaft 73 is supported in parallel to the axles 40L and 40R by the sidewall of the upper half portion 23t of the housing 23. In the housing 23, an arm 191 is fixed onto an inner end of the steering-control shaft 73, and the movable swash plate 76 is connected to the tip end of the arm 191 as shown in FIG. 6. Although the movable swash plate 76 is of a so-called cradle type, a trunnion type movable swash plate may be used.

On the other hand, as shown in FIGS. 4 to 6, a steering-control lever 193 is fixed on the steering-control shaft 73 outside of the housing 23. The steering-control lever 193 is connected to steering means (the steering wheel 14 in the present embodiment) such as a lever or a pedal through a link mechanism or the like.

A steering direction (right or left) and a steering angle are set by turning operation of the steering wheel 14, and based on this steering, the steering-control lever 193, the steering-control shaft 73 and the arm 191 turned in unison, and the movable swash plate 76 is inclined to a position corresponding to a set position of the steering wheel 14. The discharge direction and the discharge oil amount of the hydraulic oil from the hydraulic pump 71 are determined, the hydraulic oil is circulated between the hydraulic pump 71 and the hydraulic motor 72 through the pair of oil paths 75x in the center section 75, and the hydraulic motor 72 is driven to rotate the motor shaft 77 in the set rotation direction and at the set rotation speed.

A hydraulic pressure circuit in the center section 75 will be explained with reference to FIGS. 16 and the like. Both the oil paths 75x are in communication with a common intake path 289 which sucks hydraulic oil into the center section 75 by the strainer 306 through check valves 292. Each of the check valves 292 is a check valve which is opened only when the hydraulic oil is sucked to prevent the hydraulic oil from leaking from the intake path 289.

The bypass circuit having the choke for increasing the neutral position provided in the center section 51 is not provided in the center section 75 of the present embodiment because reaction of the steering operation of the steering wheel 14 is enhanced. However, each of the oil paths 75x and the intake path 289 (or oil reservoir in the housing 23) may be connected in parallel to the check valve 292 through such a bypass circuit having the choke so that the steering wheel 14 can ensure straight running within a slight lateral twisting range from the straight position.

As shown in FIGS. 4 to 7 and 9, a drain member 389 for forcibly draining oil in both the oil paths 75x is mounted to a front portion of the center section 75. The drain member 389 has a pair of parallel push pins 389c which are slidably fitted in the center section 75 from front side thereof, and rear ends of the push pins 389c are disposed in the vicinity of the check valves 292. Both the push pins 389c are integrally connected through a connection frame 389b. A drain pin button 389a is extended forward from the connection frame 389b. The drain pin button 389a projects forward from a front end of the housing 23.

When a vehicle having the transaxle apparatus 2 is pulled as described above, the drain control lever 390 is turned to drain the hydraulic oil in the HST 21, and the drain pin button 389 is pushed at the same time. With these operations, both the push pin 389c are pushed deeply into the center section 75 to push the check valves 292 for forcibly opening these valves. With this operation, the oil is drained from the higher pressured oil path 75x into the intake path 289, the hydraulic motor 72 is allowed to idle, and the pulling resistance can be reduced.

Next, the gear transmission 6 will be explained in detail with reference to FIGS. 5 to 7, 14 and 16.

In the gear transmission 6, the driving gear train formed between the motor shaft 54 which is the output shaft of the driving HST 21 and the differential gear unit 5 comprises the drive gear 69 on the motor shaft 54 and the center gear 94 on the motor shaft 54 which are meshed with each other, as above-mentioned. A sun gear 95 is fixed to a center portion of the center gear 94 as will be described later so that the rotation of the motor shaft 54 is transmitted to the sun gear 95. That is, the output of the driving HST 21 is transmitted to the sun gear 95. This output transmitting manner is shown with black arrows in FIG. 14.

On the other hand, in the dual steering gear train formed between the motor shaft 77 which is the output shaft of the HST 22 and a pair of ring gears 99 which are input gears of the steering gear system in the planet gear mechanism constituted by the differential gear unit 5, the pivot shaft 105 is horizontally disposed in parallel to the axles 40L and 40R (perpendicular to the motor shaft 77 as seen from above)

behind the bevel gear 104 provided at the rear end of the motor shaft 77 as shown in FIGS. 5 and the like. The opposite ends of the pivot shaft 105 are fixed to and supported by left and right walls of the partition wall 23*i* surrounding the accommodating portion of the gear transmission 6 of the second chamber R2. Left and right two sleeves 111 are loosely rotatably mounted to the pivot shaft 105 such as to form an annular shape. A bevel gear 106 is fixed to each of the sleeves 111 such as to form an annular shape. Both the bevel gears 106 are disposed symmetrically with respect to an extension of the motor shaft 77, and the bevel gear 106 is meshed with each of the bevel gears 104. Power transmitting gears 107 are provided on the sleeves 111 relatively non-rotatably.

The motor shaft 54 is disposed behind the pivot shaft 105 in parallel thereto, and a pair of speed-reduction gears 108 are loosely rotatably provided on the motor shaft 54 symmetrically with respect to the drive gear 69. Each speed-reduction gear 108 is a double gear comprising a large-diameter gear 108*a* and a small-diameter gear 108*b*. The large-diameter gear 108*a* meshes with the power transmitting gear 107, and the small-diameter gear 108*b* meshes with each of the ring gears 99 (which are input gears of a steering gear system in the differential gear unit 5) provided on left and right sides of the differential gear unit 5 with respect to the center gear 94.

As described above, each gear line of the dual steering gear train comprising bevel gear 106, the power transmitting gear 107 and the speed-reduction gear 108 is formed from the motor shaft 77 to each ring gear 99 of the differential gear unit 5. If the motor shaft 77 is rotated, the constituent gears of the steering gear train rotate in the opposite directions between the two lines. A power flow from the motor shaft 77 to the differential gear unit 5 through this steering gear train is shown with the hollow arrows in FIG. 14.

Next, a structure of the differential gear unit 5 will be explained with reference to FIGS. 5 to 7, 9 and 14 to 16. The center gear 94 is disposed on a laterally central portion. As shown in FIGS. 15 and the like, the center gear 94 is provided at its center portion with a center hole formed as an inner gear whose teeth are formed in correspondence with those of the sun gear 95. The sun gear 95 is fitted to the center hole and locked thereto relatively non-rotatably. Since the center gear 94 is meshed with the drive gear 69 formed on the motor shaft 54 as described above, the sun gear 95 is driven in unison with the center gear 94 by the rotation of the motor shaft 54. That is, the output of the driving HST 21 is transmitted to the sun gear 95.

The ring gears 99 are arranged on left and right sides of the center gear 94. A disc-like carrier 97 is relatively rotatably fitted to an inner periphery of each of the ring gears 99. Splines are formed in a center hole of each of the carriers 97, splines 40*b* formed on the inner end portions of each of the axles 40L and 40R ("each axle 40" hereinafter) are inserted through the center holes and locked relatively non-rotatably by the splines of the carrier 97. Further, an inner end 40*a* of each axle 40 project toward the center gear 94 from the center hole of the carrier 97, and the inner ends 40*a* of the axles 40L and 40R are rotatably fitted into the lateral through hole of the sun gear 95 in an abutment manner.

An internal gear 98 is integrally formed on the inner periphery of each of the ring gears 99 so as to be adjacent to the outer periphery of the carrier 97 which is fitted into the ring gear 99. The sun gear 95 is located in the center of a circle formed by the internal gear 98 as viewed from side. A plurality of planetary gears 96 (three, in the present embodiment) rotatably supported by each carrier 97 are interposed in the space between the sun gear 95 and the internal gear 98, and each of the planetary gears 96 is meshed with both the sun gear 95 and the internal gear 98. In this manner, the differential gear unit 5 forms the pair of left and right planetary gear mechanisms sandwiching the center gear 94.

In each of the planetary gear mechanisms, the sun gear 95 which is integral with the center gear 94 serving as the input gear of the driving gearing system is rotated by the output of the HST 21 as a driving force. Each internal gear 98 which is integral with the ring gear 99, on the other hand, serving as the input gear of the steering gear system is rotated by the output of the HST 22. With this rotation, the group of the planetary gears 96 revolve around the sun gear 95, and with this revolution, the carrier 97 rotate, and each axle 40 which is integral with the carrier 97 rotate.

If the motor shaft 77 rotates, both the ring gears 99 rotate in the opposite directions at the same speed through the dual steering gear train of the gear transmission 6 as described above, a peripheral speed of the carrier 97 of one of the planetary gear mechanisms becomes equal to a sum of a peripheral speed of the sun gear 95 (center gear 94) and a peripheral speed of the internal gear 98 (ring gear 99) of the one planetary gear mechanism, and a peripheral speed of the carrier 97 of the other planetary gear mechanism becomes equal to a speed obtained by subtracting a peripheral speed of the internal gear 98 of the other planetary gear mechanism from a peripheral speed of the sun gear 95. With this design, a difference is produced between the rotational speeds of the axles 40L and 40R to turn the vehicle.

Figure 14:
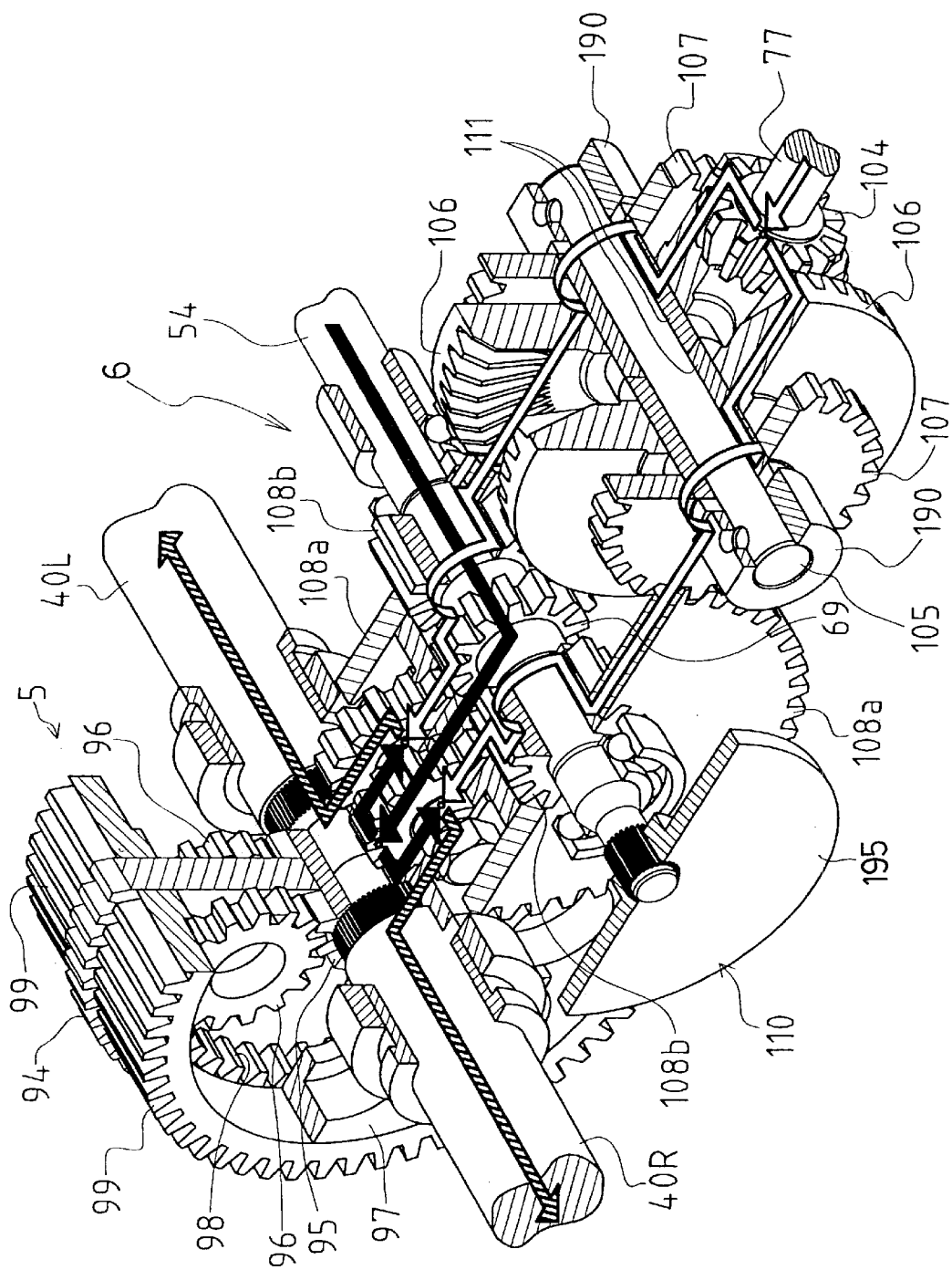
FIG. 14 is a partially cut-away sectional perspective view of a driveline mechanism showing arrows indicative of directions of powers transmitted to axles 40L and 40R by motor shafts 54 and 77 of the HSTs 21 and 22 through a gear transmission 6 and a differential gear unit 5.
Figure 15:
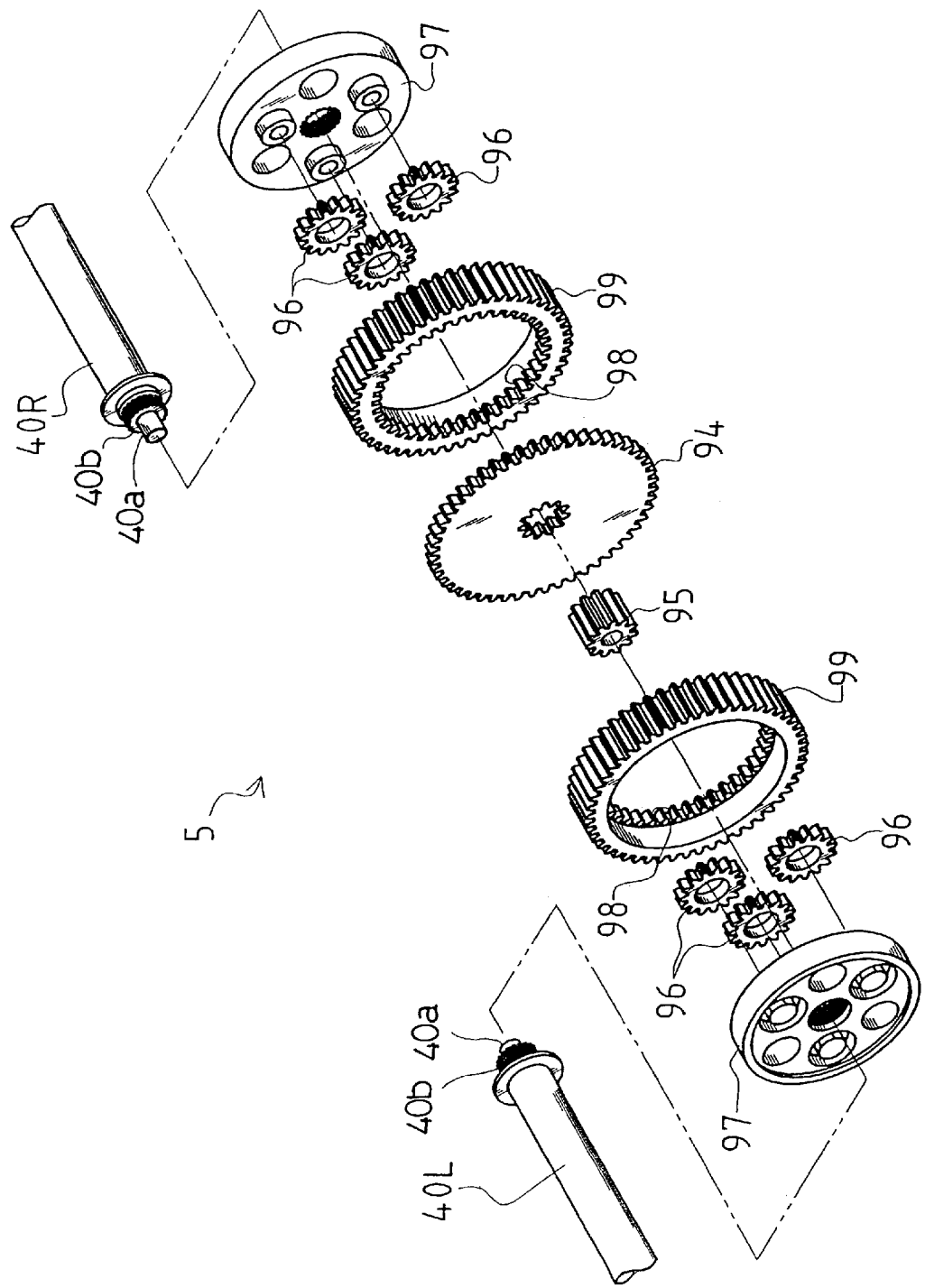
FIG. 15 is an exploded perspective view showing parts of the axles 40L and 40R and the differential gear unit 5 in the assembling process.

In FIG. 14, in the differential gear unit 5, flows of power transmitted to the center gear 94 through the driving gear train of the gear transmission 6 which is further transmitted to the carriers 97 through the sun gear 95 and the planetary gears 96, respectively, are shown with black arrows. Further, two flows of power transmitted to both the ring gears 99 through the dual steering gear train of the gear transmission 6 which is transmitted to the carriers 97 through the internal gear 98 and the planetary gears 96, respectively, are shown with hollow arrows.

Power flowing from each carrier 97 which has obtained both driving power and steering power in this manner to each axle 40 is shown with each of shaded arrows In the structure of the differential gear unit 5, since the carrier 97 as an output portion of each planetary gear mechanism integrally mounted to each axle 40 is fitted in the ring gear 99 as an input portion of each planetary gear mechanism there is no positional difference in the lateral direction between the carrier 97 and the ring gear 99.

Therefore, the differential gear unit 5 is compact in the lateral direction. The structure of the integral-type transaxle apparatus 2 according to one embodiment of the present invention has been described above. Some modifications of the integral-type transaxle apparatus of the present invention will be explained next.

An integral-type transaxle apparatus 2*a* as shown in FIG. 17 uses a trunnion type moveable swash plate 57' as the moveable swash plate of the HST 21 instead of the cradle type moveable swash plate 57 used in the integral-type transaxle apparatus 2. Although the horizontal speed-change control shaft 59 was used in the transaxle apparatus 2 of the previous embodiment, the transaxle apparatus 2*a* uses a vertical speed-change control shaft 59'. An arm is fixed onto a lower end of the speed-change control shaft 59', and its tip end is locked to a movable swash plate 57'. On the other hand, an upper end of the speed-change control shaft 59' projects upward through a ceiling portion of the housing 23 (upper half portion 23*t*), and a base end of a speed-change control lever 60' is fixed to the upper end. That is, the speed-change control lever 60 of the transaxle apparatus 2 is turned in the vertical direction whereas, the speed-change control lever 60' of the transaxle apparatus 2*a* is turned in the horizontal direction. This speed-change control lever 60' is connected to speed-change operation means on the vehicle such as the speed-change pedal 15 by a link, or the like. Other structures are the same as that of the transaxle apparatus 2.

Figure 18:
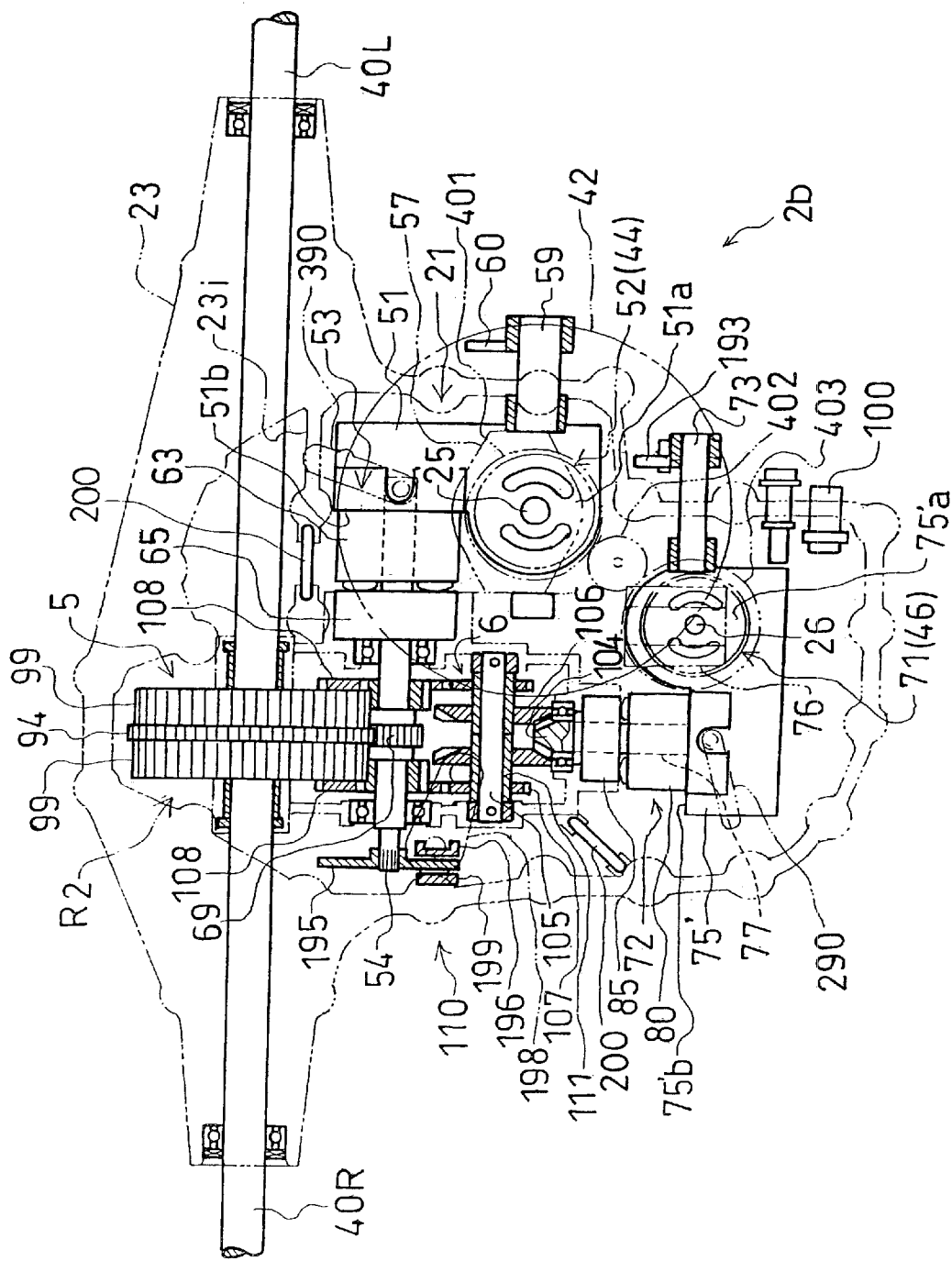
FIG. 18 is a partial sectional plan view of an interior of an integral-type transaxle apparatus 2b in which a form of the center section of the steering HST 22 is changed and its input is obtained from an input shaft of the driving HST 21.
Figure 19:
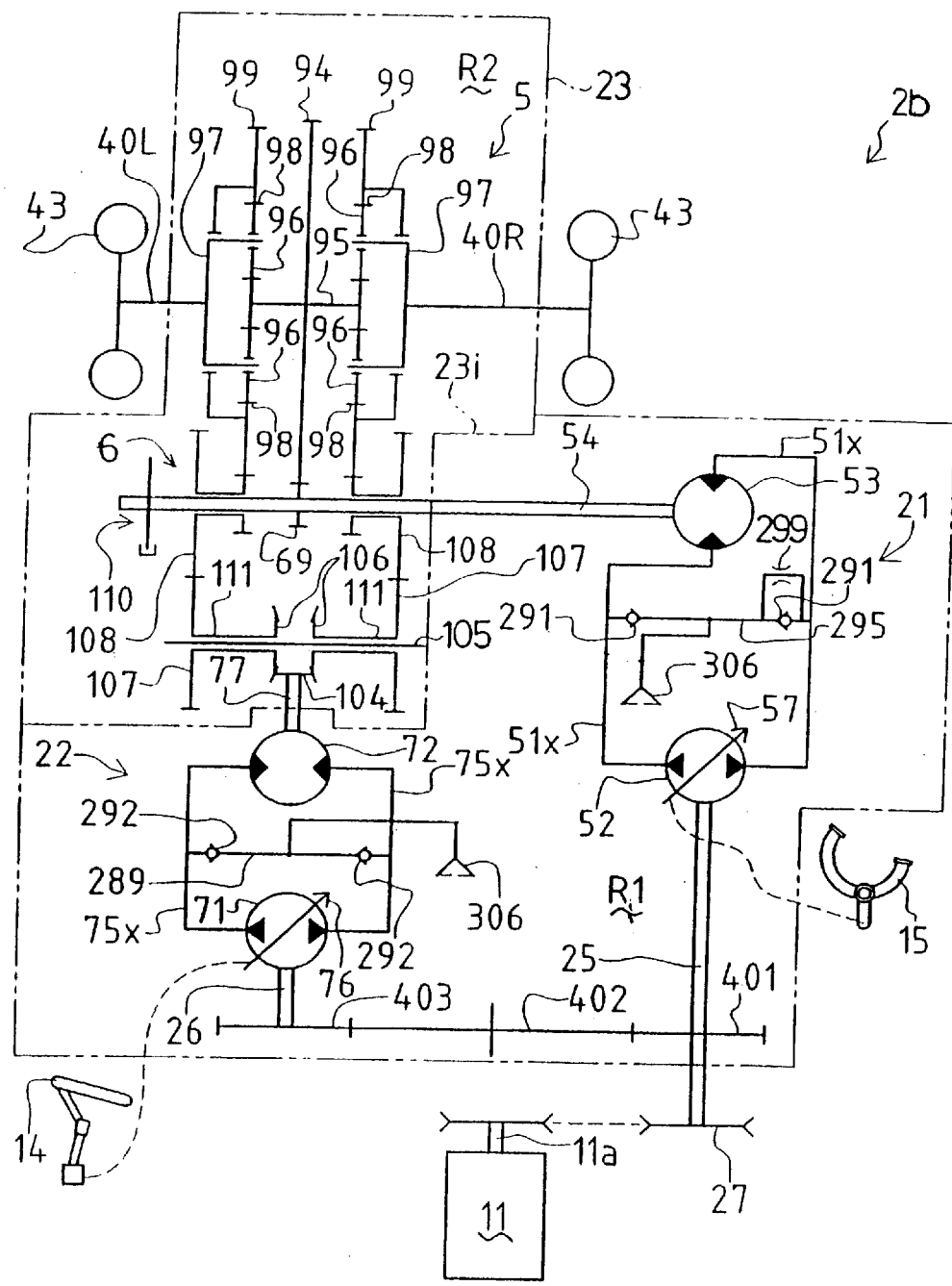
FIG. 19 is a hydraulic circuit diagram of the integral-type transaxle apparatus 2b and a skeleton diagram of a power transmission system thereof.

Next, an integral-type transaxle apparatus 2*b* shown in FIGS. 18 and 19 uses, as a center section of the steering HST 22, a center section 75' having a d-shape as seen from above like the center section 51 instead of the center section 75 having the L-shaped side section, and inputs rotational power of the pump shaft 25 which is the input shaft of the driving HST 21 to the pump shaft 26 as the input shaft of the HST 22.

In the steering HST 22, the hydraulic pump 71 and the hydraulic motor 72 are disposed longitudinally in the transaxle apparatus 2. However, in the present embodiment, when a center section 75' is disposed, a pump-mounting face 75'*a* is disposed on one of left and right sides of the motor-mounting face 75'*b* (on the side of the HST 21). With this layout, the hydraulic pump 71 is disposed on one of the left and right sides of the hydraulic motor 72, and it is possible to provide the transaxle apparatus 2*b* whose longitudinal length is shortened correspondingly as compared with the transaxle apparatus 2.

Further, since the hydraulic pump 71 is disposed near the hydraulic pump 52 of the HST 21, a distance between the pump shaft 25 and the pump shaft 26 is shortened, and it is possible to interpose a compact drive train between both the shafts 25 and 26. Thereupon, in the present embodiment, a steering driving gear 401 is fixed to the pump shaft 25 of the driving HST 21, a steering input gear 403 is fixed to the pump shaft 26 of the HST 22, a power transmitting gear 402 is interposed between both the gears 401 and 403, thereby forming a gear train for transmitting a power from the pump shaft 25 to the pump shaft 26 by the gears 401, 402 and 403.

Therefore, in the transaxle apparatus 2, the pump shafts 25 and 26 which are the input shafts of the HSTs 21 and 22 project upward from the housing 23 to obtain the power from the engine 11, but in the transaxle apparatus 2*b* of the present embodiment, only the pump shaft 25 projects upward from the housing 23, the input pulley 27 is fixed to the projecting upper end to obtain the power of the engine, and engine power can be input to both the HSTs 21 and 22 with one input shaft. Other structure is the same as that of the transaxle apparatus 2.

Figure 20:
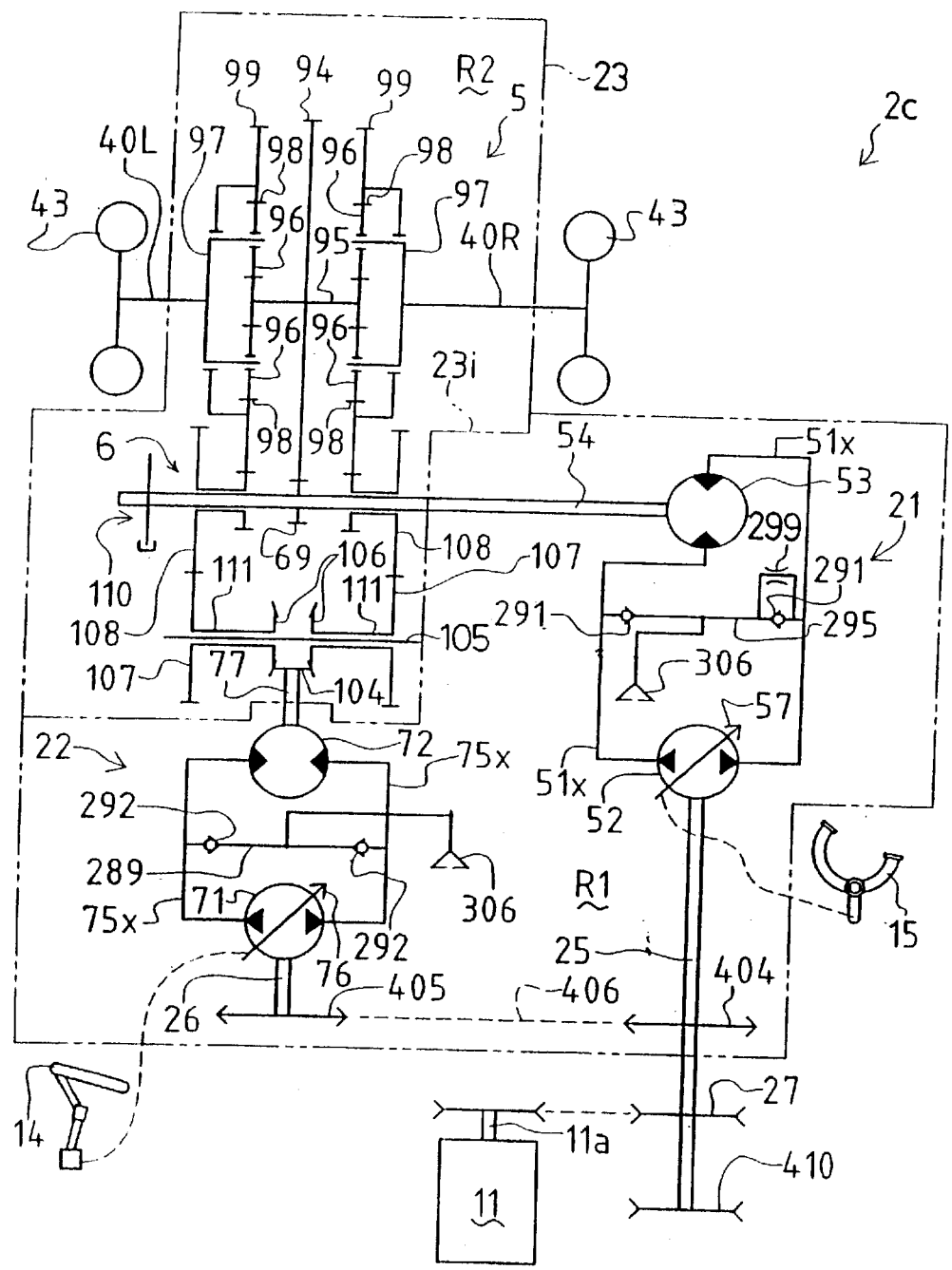
FIG. 20 is a hydraulic circuit diagram of an integral-type transaxle apparatus 2c in which an input of the steering HST 22 is obtained by a chain drive train of the driving HST 21 and a skeleton diagram of a power transmission system.

As another embodiment of the integral-type transaxle apparatus having a structure capable of inputting the engine power to both the HSTs 21 and 22 with one input shaft, there is provided an integral-type transaxle apparatus 2*c* shown in FIG. 20. That is, in the housing 23, a steering driving sprocket 404 is fixed to the pump shaft 25 of the driving HST 21, a steering input sprocket 405 is fixed to the pump shaft 26 of the steering HST 22, and a chain 406 is wound around both the sprockets 404 and 405. The pump shaft 25 is projected outside from the housing 23, and the input pulley 27 is fixed to the projected end to obtain the power from the engine output shaft 11*a* through the belt. In the present embodiment, in addition to the input pulley 27, a PTO output pulley 410 is also fixed as output means to a PTO gearing system. This PTO power is used for driving a utility machine to be connected to a tractor when a vehicle to which the transaxle apparatus 2*c* is applied is the tractor. Other structure is the same as that of the transaxle apparatus 2.

As described above, the present invention provides a compact integral-type transaxle apparatus especially whose vertical size is reduced, and the invention is applied to, in addition to the lawnmower tractor disclosed in the embodiments, a vehicle requiring stepless speed changing and small turning movement, and can contribute to compactness of the vehicle (especially height of the vehicle can be lowered).

It is obvious that a person skilled in the art can make various changes within the scope of the invention in addition to some embodiments described above and illustrated in the drawings, and the invention may be variously changed in accordance with a vehicle to which the invention is to be applied.

What is claimed is:

1. An integral type transaxle apparatus, comprising:
    a common housing in which a pair of driving axles, a differential mechanism for differentially connecting both said driving axles to each other, a driving hydraulic stepless transmission which fluidly connects a hydraulic pump and a hydraulic motor, a steering hydraulic stepless transmission which fluidly connects a hydraulic pump and a hydraulic motor, and a mechanical a transmission for transmitting outputs of both said hydraulic stepless transmissions to said differential mechanism are accommodated, wherein said driving hydraulic stepless transmission and said steering hydraulic stepless transmission receive power from a prime mover individually, wherein at least one of said hydraulic stepless transmissions is disposed such that a rotational axis of a pump shaft of said one hydraulic stepless transmission and a rotational axis of a motor shaft of said one hydraulic stepless transmission are perpendicular to each other, and wherein the rotational axis of said motor shaft of said one hydraulic stepless transmission and a rotational axis of a motor shaft of the other hydraulic stepless transmission are disposed perpendicularly to each other.

2. The integral-type transaxle apparatus according to claim 1, wherein said differential mechanism includes a pair of planetary gear mechanism, an output of said driving hydraulic stepless transmission and an output of said steering hydraulic stepless transmission are transmitted to a planetary gear of each of said planetary gear mechanisms, each of said axles is rotated by revolution of said planetary gear.

3. The integral-type transaxle apparatus according to claim 1, wherein said hydraulic stepless transmission having the rotational axis of said pump shaft and the rotational axis of said motor shaft being perpendicular to each other includes a center section in which shaft supporting portions of said pump shaft and said motor shaft are formed such that both said rotational axes are perpendicular to each other.

4. The integral-type transaxle apparatus according to claim 3, wherein said center section in which said shaft supporting portions of said pump shaft and said motor shaft are perpendicular to each other is formed into substantially a d-shape as seen from one side, and includes two mounting faces for said hydraulic pump or said hydraulic motor, and said mounting faces are perpendicular to each other.

5. The integral-type transaxle apparatus according to claim 1, wherein in said hydraulic stepless transmission having the rotational axis of said pump shaft and the rotational axis of said motor shaft perpendicular to each other, a rotational axis of said motor shaft of at least one of said hydraulic stepless transmissions is disposed horizontally.

6. The integral-type transaxle apparatus according to claim 5, wherein at least one of said motor shafts having horizontal rotational axis is disposed in parallel to said driving axles.

7. The integral-type transaxle apparatus according to claim 6, wherein said motor shaft disposed in parallel to said axles is provided with an output member and its directly connected to an input member of said differential mechanism for driving the latter.

8. The integral-type transaxle apparatus according to claim 5, wherein said hydraulic stepless transmission having said horizontal rotational axis of said motor shaft includes a center section having substantially a d-shape as seen from above in a state in which said hydraulic pump-mounting face is disposed horizontally and said hydraulic motor-mounting face is disposed vertically.

9. The integral-type transaxle apparatus according to claim 1, wherein said housing is divided into at least two chambers, both said hydraulic stepless transmissions are disposed in at least one chamber, and said differential mechanism and said mechanical transmission are disposed in the chamber other than said at least one chamber in which both said hydraulic stepless transmissions are disposed.

10. An integral type transaxle apparatus, comprising:
a common housing in which a pair of driving axles, a differential mechanism for differentially connecting both said driving axles to each other, a driving hydraulic stepless transmission which fluidly connects a hydraulic pump and a hydraulic motor, a steering hydraulic stepless transmission which fluidly connects a hydraulic pump and a hydraulic motor, and a mechanical transmission for transmitting outputs of both said hydraulic stepless transmissions to said differential mechanism are accommodated, wherein said driving hydraulic stepless transmission and said steering hydraulic stepless transmission receive power from a prime mover individually, wherein a motor shaft of said steering stepless transmission is arranged horizontally in a direction perpendicular to a rotational axis of said motor shaft of said driving hydraulic stepless transmission and to axes of both of said driving axles.

11. The integral-type transaxle apparatus according to claim 10, wherein said differential mechanism includes a pair of planetary gear mechanisms, an output of said driving hydraulic stepless transmission and an output of said steering hydraulic stepless transmission are transmitted to a planetary gear of each of said planetary gear mechanisms, each of said axles is rotated by revolution of said planetary gear.

12. The integral-type transaxle apparatus according to claim 10, wherein a motor shaft of said hydraulic motor of said steering hydraulic stepless transmission is arranged in a direction perpendicular to said driving axles, and is extended to said mechanical transmission.

13. The integral-type transaxle apparatus according to claim 12, wherein a pump shaft of said steering hydraulic stepless transmission is directed perpendicular to a motor shaft of said hydraulic motor of said steering hydraulic stepless transmission.

14. The integral-type transaxle apparatus according to claim 10, wherein said hydraulic motor of said steering hydraulic stepless transmission is disposed between said hydraulic pump of said steering hydraulic stepless transmission and said mechanical transmission.

15. The integral-type transaxle apparatus according to claim 10, wherein said driving hydraulic pump of said steering hydraulic stepless transmission is arranged on one side of said hydraulic motor of said steering hydraulic stepless transmission.

16. The integral-type transaxle apparatus according to claim 10, wherein said driving hydraulic stepless transmission is arranged on one side of said mechanical transmission.

17. The integral-type transaxle apparatus according to claim 16, wherein said hydraulic motor of said driving hydraulic stepless transmission includes a motor shaft which is extended to said mechanical transmission in parallel to said drive axles.

18. The integral-type transaxle apparatus according to claim 17, wherein a pump shaft of said hydraulic pump of said driving hydraulic stepless transmission is extended in a direction perpendicular to a motor shaft of said hydraulic motor of said driving hydraulic stepless transmission.

19. The integral-type transaxle apparatus according to claim 17, wherein said housing integrally comprises two housing members, at least one of motor shafts of one of both said hydraulic stepless transmissions is disposed on a connecting face of said both housing members.

20. The integral-type transaxle apparatus according to claim 19, wherein said mechanical transmission includes a medium power transmitting shaft which is an parallel to said driving axles, said medium power transmitting shaft is disposed on said connecting face.

21. The integral-type transaxle apparatus according to claim 19, wherein said axis of said driving axles is provided such that said axis is deviated from and in parallel to said connecting face.

22. An integral type transaxle apparatus, comprising:
a common housing in which a pair of driving axles, a differential mechanism for differentially connecting both said driving axles to each other, a driving hydraulic stepless transmission which fluidly connects a hydraulic pump and a hydraulic motor, a steering hydraulic stepless transmission which fluidly connects a hydraulic pump and a hydraulic motor, and a mechanical transmission for transmitting outputs of both said hydraulic stepless transmissions to said differential mechanism are accommodated, wherein said driving hydraulic stepless transmission and said steering hydraulic stepless transmission receive power from a prime mover individually, wherein at least one of said hydraulic stepless transmissions is disposed so that rotational axes of a pump shaft and a motor shaft thereof are perpendicular to each other and the rotational axis of said motor shaft is horizontal, and wherein the rotational axis of said motor shaft of said one hydraulic stepless transmission and a rotational axis of a motor shaft of the other hydraulic stepless transmission are disposed perpendicularly to each other.

23. An integral type transaxle apparatus, comprising:
a driving hydraulic stepless transmission which fluidly connects a hydraulic pump and a hydraulic motor;
a steering hydraulic stepless transmission which fluidly connects a hydraulic pump and a hydraulic motor, wherein said driving hydraulic stepless transmission and said steering hydraulic stepless transmission receive power from a prime mover individually, wherein at least one of said hydraulic stepless transmissions is disposed so that rotational axes of a pump shaft and a motor shaft thereof are perpendicular to each other, and wherein the rotational axis of said motor shaft of said one hydraulic stepless transmission and a rotational axis of a motor shaft of the other hydraulic stepless transmission are disposed perpendicularly to each other; and a common housing in which a pair of driving axles, a differential mechanism for differentially connecting both said driving axles to each other, and a mechanical transmission for transmitting outputs of both said hydraulic stepless transmissions to said differential mechanism are accommodated.

* * * * *